United States Patent
Akada

(10) Patent No.: US 10,547,256 B2
(45) Date of Patent: Jan. 28, 2020

(54) MOTOR DRIVING APPARATUS CAPABLE OF RELIABLY STARTING MOTOR, AND METHOD OF CONTROLLING SAME

(71) Applicant: CANON KABUSHIKI KAISHA, Tokyo (JP)

(72) Inventor: Hiroshi Akada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/180,549

(22) Filed: Nov. 5, 2018

(65) Prior Publication Data
US 2019/0140565 A1 May 9, 2019

(30) Foreign Application Priority Data

Nov. 8, 2017 (JP) ................................. 2017-215595
Oct. 4, 2018 (JP) ................................. 2018-189477

(51) Int. Cl.
*H02P 6/18* (2016.01)
*H02P 6/20* (2016.01)

(52) U.S. Cl.
CPC ................ *H02P 6/186* (2013.01); *H02P 6/20* (2013.01)

(58) Field of Classification Search
CPC ...... H02K 1/27; H02K 21/021; H02K 1/2706; H02K 1/278; H02K 1/2786; H02K 11/20; H02K 11/21; H02K 29/08; H02K 1/2793; H02K 21/24; H02K 1/223; H02K 15/02; H02K 15/03; H02K 21/046; H02K 3/00; H02K 3/28; H02K 17/06; H02K 17/14; H02K 19/12; H02K 19/32; H02K 37/00; H02K 29/12; H02K 11/00; H02P 1/00; H02P 1/04; H02P 1/46; H02P 3/00; H02P 3/18; H02P 6/00; H02P 6/14; H02P 21/00;

(Continued)

(56) References Cited

U.S. PATENT DOCUMENTS 5,095,238 A * 3/1992 Suzuki .................... H02K 29/08
310/156.46
6,647,325 B2 * 11/2003 Shimazaki .......... B60L 15/2045
701/22

(Continued)

FOREIGN PATENT DOCUMENTS

JP 6120563 B2 4/2017

*Primary Examiner* — Antony M Paul
(74) *Attorney, Agent, or Firm* — Rossi, Kimms & McDowell LLP

(57) ABSTRACT

A motor driving apparatus includes a motor and a control circuit that controls driving of the motor. The motor includes a rotor having a cylindrical magnet having an outer peripheral surface circumferentially divided and alternately multi-polar magnetized to different poles, a first and second yokes having first and second magnetic pole portions arranged opposed to the outer peripheral surface, a first and second coils energized to excite the first and second magnetic pole portions, respectively. Directions of energizing the first and second coils are switched based on outputs from magnetic sensors that detect a rotational position of the rotor to change excited poles of the first and second magnetic pole portions. The rotor is started from a stopped state, after performing direct current energization to move the rotor to a position dependent on the direct current energization.

11 Claims, 15 Drawing Sheets

(58) Field of Classification Search
CPC .......... H02P 23/00; H02P 23/12; H02P 25/00;
H02P 27/00
USPC ......... 318/400.01, 400.02, 400.14, 700, 701,
318/721, 727, 799, 800, 801, 430, 432,
318/490; 310/49 R, 156.01, 156.05,
310/156.34, 156.82, 216, 217, 68 B, 193,
310/254, 187, 162
See application file for complete search history.

(56) References Cited

U.S. PATENT DOCUMENTS

| | | | |
|---|---|---|---|
| 7,888,828 B2* | 2/2011 | Takahashi | ................ H02K 5/18 |
| | | | 310/54 |
| 9,553,535 B2 | 1/2017 | Aoshima | |

* cited by examiner

ROTATIONAL ANGLE [deg]

ROTATIONAL ANGLE [deg]

ROTATIONAL ANGLE [deg]

MOTOR DRIVING APPARATUS CAPABLE OF RELIABLY STARTING MOTOR, AND METHOD OF CONTROLLING SAME

BACKGROUND OF THE INVENTION

Field of the Invention

The present invention relates to a motor driving apparatus including means for detecting a rotational position and a method of controlling the same.

Description of the Related Art

A motor driving apparatus drives a motor by detecting a rotational position of the motor, and setting beforehand the timing of switching energization of coils with respect to the detected rotational position. This energization switching timing is generally referred to as an advance angle, and by setting the advance angle, it is possible to change rotational characteristics of the motor within a range of performance which can be originally achieved by the motor. That is, when the advance angle is large (i.e. when the energization switching timing is earlier), in general, the motor is rotated at higher speed under the same load, whereas when the advance angle is small (i.e. when the energization switching timing is later), in general, the motor is rotated at a lower speed under the same load (see Publication of Japanese Patent No. 6120563).

However, according to the technique disclosed in Publication of Japanese Patent No. 6120563, when a large or small advance angle is set, a ripple of output torque (torque ripple) with respect to a rotational angle of the motor becomes larger than in a case where the advance angle is not set. Further, it is necessary to make it possible to reliably start the motor by overcoming the load of a drive mechanism even when the motor is started at a position of the rotational angle of the motor at which the output torque of the motor drops to the lowest torque. Therefore, it is necessary to increase the output torque, which is dropped to the lowest, by increasing the whole output of the motor, or set the load of the drive mechanism to be low in accordance with the lowest output torque of the motor. For this reason, at the stage of designing the motor, it is necessary to set the driving load as low as possible.

SUMMARY OF THE INVENTION

The present invention provides a motor driving apparatus that is capable of reliably starting a motor even when a drive mechanism is under a relatively high driving load and a method of controlling the same.

In a first aspect of the present invention, there is provided a motor driving apparatus comprising a motor, and a control circuit that controls driving of the motor, the motor including a rotor having a magnet that has a cylindrical shape and an outer peripheral surface which is divided in a circumferential direction and is alternately multi-polar magnetized to different poles, a first yoke having first magnetic pole portions which are arranged in an opposed relationship to the outer peripheral surface of the magnet, a first coil that is energized to thereby excite the first magnetic pole portions, a second yoke having second magnetic pole portions which are arranged in an opposed relationship to the outer peripheral surface of the magnet at respective positions shifted from the first magnetic pole portions each by a predetermined electrical angle, and a second coil that is energized to thereby excite the second magnetic pole portions, wherein the control circuit drives the rotor by switching respective directions of energizing the first coil and the second coil based on outputs from a plurality of position detection sensors that detect a rotational position of the rotor, to thereby change poles to which the first magnetic pole potions and the second magnetic pole portions are excited, and when the rotor is started from a state in which the rotor is stopped, the control circuit performs direct current energization to move the rotor to a position dependent on the direct current energization, and then starts the rotor.

In a second aspect of the present invention, there is provided a method of controlling driving of a motor including a rotor having a magnet that has a cylindrical shape and an outer peripheral surface which is divided in a circumferential direction and is alternately multi-polar magnetized to different poles, a first yoke having first magnetic pole portions which are arranged in an opposed relationship to the outer peripheral surface of the magnet, a first coil that is energized to thereby excite the first magnetic pole portions, a second yoke having second magnetic pole portions which are arranged in an opposed relationship to the outer peripheral surface of the magnet at respective positions shifted from the first magnetic pole portions each by a predetermined electrical angle, and a second coil that is energized to thereby excite the second magnetic pole portions, the method comprising driving the rotor by switching respective directions of energizing the first coil and the second coil based on outputs from a plurality of position detection sensors that detect a rotational position of the rotor, to thereby change poles to which the first magnetic pole potions and the second magnetic pole portions are excited, and performing, when starting the rotor from a state in which the rotor is stopped, direct current energization to move the rotor to a position dependent on the direct current energization, and then starting the rotor.

According to the present invention, it is possible to provide a motor driving apparatus that is capable of reliably starting a motor by avoiding the start at a lower limit value of the output torque ripple even when the driving load is relatively high.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
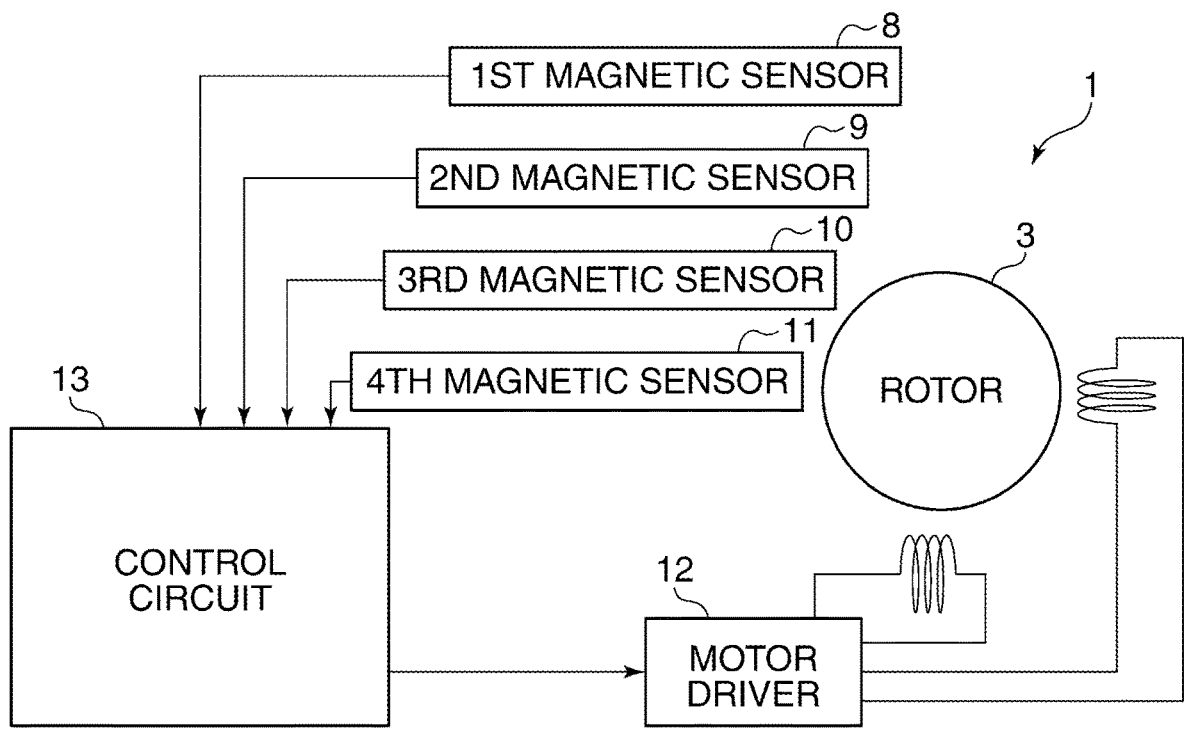
FIG. 1 is a block diagram of a motor driving apparatus according to a first embodiment of the present invention.
Figure 2:
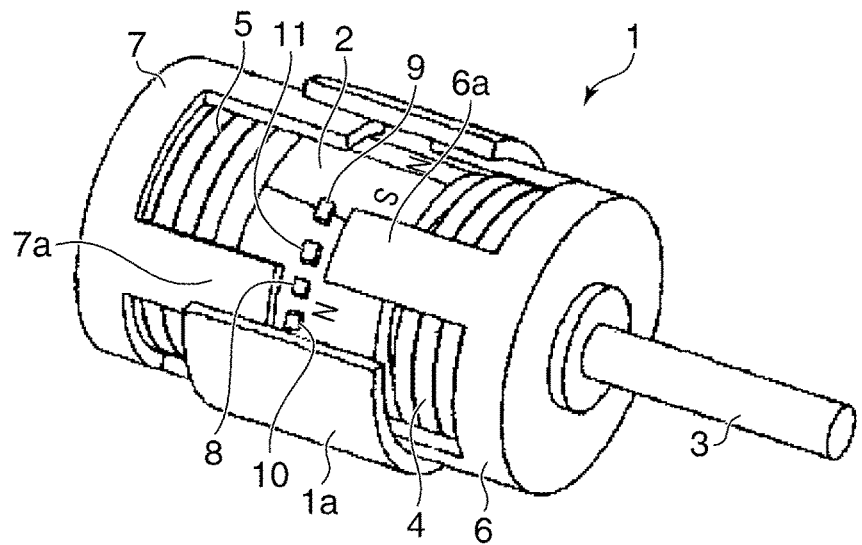
FIG. 2 is a perspective view showing the appearance of a motor.

FIG. 1 is a block diagram of a motor driving apparatus according to a first embodiment of the present invention. FIG. 2 is a perspective view showing the appearance of a motor 1. Note that FIG. 2 shows the motor 1, partly broken away, for the convenience of explanation.

In the motor driving apparatus according to the present embodiment, as shown in FIGS. 1 and 2, a rotor 3 of the motor 1 has a magnet 2, and rotation of the motor 1 is controlled by a control circuit 13. A control signal delivered from the control circuit 13 is input to a motor driver 12, and is input from the motor driver 12 to a first coil 4 and a second coil 5 to thereby excite a first yoke 6 and a second yoke 7, whereby the rotor 3 is rotated. The magnet 2 is formed into a cylindrical shape, and is divided into a plurality of portions in a circumferential direction, which are alternately multipolar magnetized to different poles. Note that in the present embodiment, the magnet 2 is magnetized to eight poles, but may be magnetized to four poles, twelve poles, or the like.

The first coil 4 is arranged at one end of the magnet 2 in an axial direction. The first yoke 6 is formed of a soft magnetic material, and is arranged in an opposed relationship to an outer peripheral surface of the magnet 2 with a gap therebetween. Further, the first yoke 6 has a plurality of first magnetic pole portions 6a, which are extended from an annular shaped main body of the first yoke 6 in the axial direction, and are arranged at predetermined space intervals in the circumferential direction. The first magnetic pole portions 6a are excited by energizing the first coil 4. The first coil 4, the first yoke 6, and the magnet 2 opposed to the plurality of first magnetic pole portions 6a form a first stator unit.

The second coil 5 is arranged at the other end of the magnet 2 which is axially opposite from the one end where the first coil 4 is arranged. The second yoke 7 is formed of a soft magnetic material, and is opposed to the outer peripheral surface of the magnet 2 with a gap therebetween. Further, the second yoke 7 has a plurality of second magnetic pole portions 7a, which are extended from an annular shaped main body of the second yoke 7 in the axial direction, and are arranged at predetermined space intervals in the circumferential direction. The second magnetic pole portions 7a are excited by energizing the second coil 5. The second coil 5, the second yoke 7, and the magnet 2 opposed to the plurality of second magnetic pole portions 7a form a second stator unit. By switching the poles (N pole and S pole) to which the first magnetic pole portions 6a and the second magnetic pole portions 7a are excited, it is possible to change torque applied to the rotor 3.

A first magnetic sensor 8, a second magnetic sensor 9, a third magnetic sensor 10, and a fourth magnetic sensor 11, as position detection sensors, are each a magnetic induction element for detecting a magnetic flux of the magnet 2, and are each implemented e.g. by a hall element. The first to fourth magnetic sensors 8 to 11 are fixed to a motor cover 1a.

The motor cover 1a fixedly holds the first yoke 6 and the second yoke 7 in a state in which each pair of a first magnetic pole portion 6a and a second magnetic pole portion 7a are disposed such that the first magnetic pole portion 6a is displaced from the second magnetic pole portion 7a by an electrical angle of approximately 90 degrees with respect to the magnetization phase of the magnet 2. The electrical angle as used herein means an angle expressed by regarding one period of the magnetic force of the magnet 2 as 360 degrees. Assuming that the number of poles of the rotor 3 is represented by M, and a mechanical angle is represented by θ0, the electrical angle θ can be expressed by the following equation:

$$\text{electrical angle } \theta = \theta 0 \times M/2$$

In the illustrated example, since the number of poles magnetized in this embodiment is eight, an electrical angle of 90 degrees is equal to a mechanical angle of 22.5 degrees.

Figure 3:
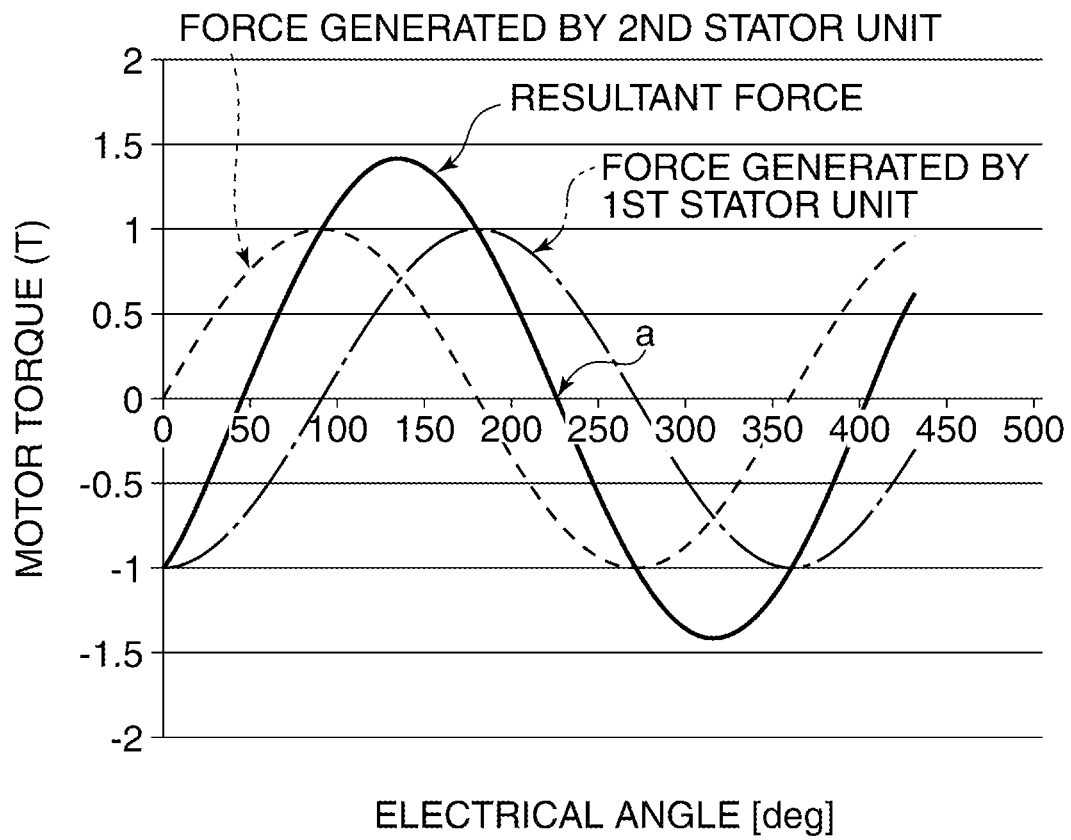
FIG. 3 is a graph showing a relationship between a rotational angle of a rotor and motor torque, which holds when a constant current is passed through coils of the motor.
Figure 4A:
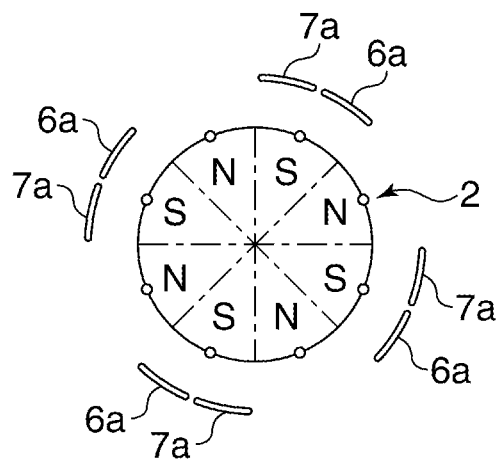
FIGS. 4A and 4B are cross-sectional views of the motor, taken along a direction perpendicular to an axis of the motor, which show phase relationships between yokes and a magnet.
Figure 4B:
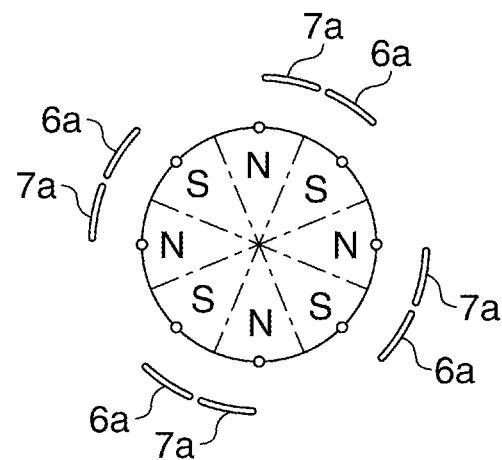

Next, a description will be given of an operation of a feedback energization switching mode based on electrical angles, with reference to FIGS. 3 to 6I. FIG. 3 is a diagram showing a relationship between the rotational angle of the rotor 3 and the torque of the motor 1, which holds when predetermined electric current is passed through the coils of the motor 1. Referring to FIG. 3, the horizontal axis represents an electrical angle, and the vertical axis represents the torque of the motor 1. Torque generated when the rotor 3 is rotated in a clockwise direction is defined as positive. FIGS. 4A and 4B are schematic cross-sectional views of the motor 1 taken along a direction perpendicular to the axis of the motor 1, which show phase relationships between the yokes 6 and 7 and the magnet 2.

Now, it is assumed that an electric current passed through the first coil 4 in the positive direction causes the first magnetic pole portions 6a to be magnetized to the N pole, and an electric current passed through the second coil 5 in the positive direction causes the second magnetic pole portions 7a to be magnetized to the N pole. The phase relationship shown in FIG. 4A is indicated by a symbol "a" in FIG. 3. FIG. 4A shows a state in which a distance between the center of a magnetic pole of the magnet 2 and an associated one of the first magnetic pole portions 6a, which is opposed to the magnetic pole, and a distance between the center of the magnetic pole of the magnet 2 and an associated one of the second magnetic pole portions 7a, which is opposed to the magnetic pole, are equal to each other. In the state shown in FIG. 4A, although a force for holding the rotational phase is generated, the S poles of the magnet 2 are attracted to the first magnetic pole portions 6a and the second magnetic pole portions 7a, and the magnetic forces are in a balanced state, so that a rotational driving force is not generated. When the energization of the second magnetic pole portions 7a is switched from the phase relationship shown in FIG. 4A such that they are excited to the S pole, the rotor 3 is rotated to a position indicated by the phase relationship shown in FIG. 4B.

In the state shown in FIG. 4B, although a force for holding the rotational phase is generated, a rotational driving force is not generated similarly to the state shown in FIG. 4A. That is, the S poles of the magnet 2 are attracted to the first magnetic pole portions 6a of the first yoke 6, and the N poles of the magnet 2 are attracted to the second magnetic pole portions 7a of the second yoke 7, whereby a balanced state is generated. By sequentially switching the respective directions of energizing the first coil 4 and the second coil 5 in the same manner as described above to thereby switch the polarities of the first magnetic pole portions 6a and the second magnetic pole portions 7a, it is possible to cause the rotor 3 to rotate.

Switching of the poles to which the first magnetic pole portions 6a and the second magnetic pole portions 7a are excited, by switching the respective directions of energizing the first coil 4 and the second coil 5 in the above-described timing that the rotational driving force is not generated, is referred to as "energization switching with an electrical advance angle of 0 degrees". Note that switching of the poles to which the first magnetic pole portions 6a and the second magnetic pole portions 7a are excited, by switching the respective directions of energizing the first coil 4 and the second coil 5 at an earlier timing than the above-described timing, is referred to as "energization switching with an electrical advance angle of γ degrees.

Figure 5A:
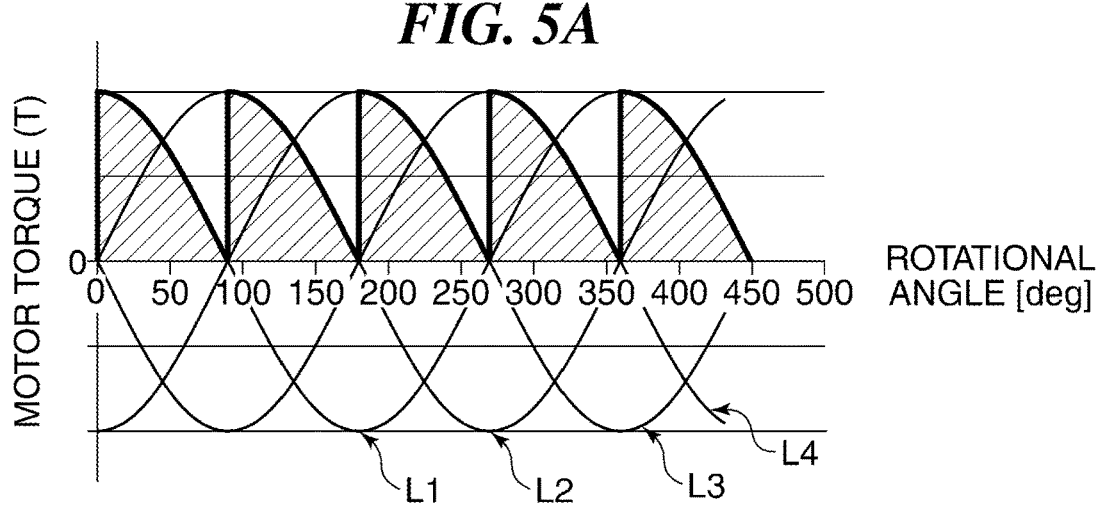
FIGS. 5A to 5C are graphs in each of which the horizontal axis represents a rotational angle of the rotor, and the vertical axis represents motor torque generated according to a state of energization of a first coil and a second coil.
Figure 5B:
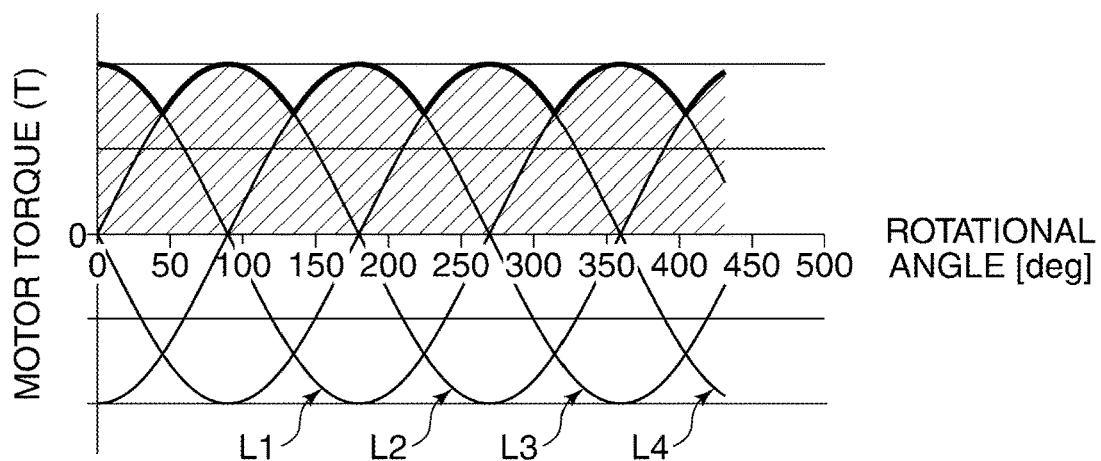
Figure 5C:
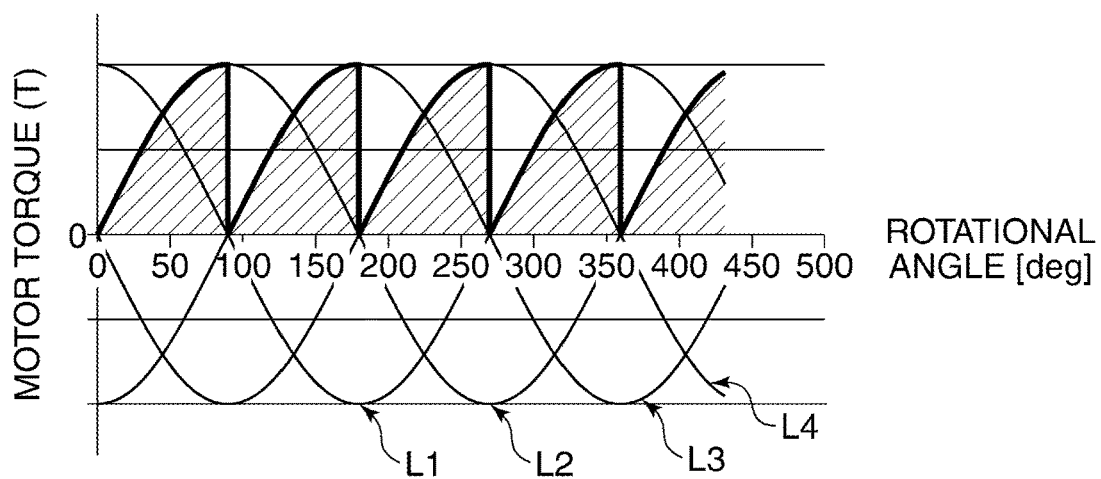

FIGS. 5A to 5C are graphs in each of which the horizontal axis represents a rotational angle (electrical angle) of the rotor 3 and the vertical axis represents motor torque generated according to a state of energization of the first coil 4 and the second coil 5. Referring to FIGS. 5A to 5C, a line L1 indicates a case where the first coil 4 is energized in the positive direction, and the second coil 5 is energized in the positive direction. A line L2 indicates a case where the first coil 4 is energized in the positive direction, and the second coil 5 is energized in an opposite direction. A line L3 indicates a case where the first coil 4 is energized in the opposite direction, and the second coil 5 is energized in the opposite direction. A line L4 indicates a case where the first coil 4 is energized in the opposite direction, and the second coil 5 is energized in the positive direction.

FIG. 5A shows changes in the motor torque occurring when the electrical advance angle is 0 degrees. However, if each of the respective directions of energizing the first and second coils 4 and 5 is switched at such timing, the motor torque becomes very small in a phase immediately before switching the energization direction (direction of energizing each coil), as is apparent from hatching and solid lines, and hence the output of the motor 1 is not large.

FIG. 5B shows changes in the motor torque occurring when the electrical advance angle is 45 degrees. In this case, the motor torque generated when each of each of the respective directions of energizing the first and second coils 4 and 5 is switched becomes maximum. Further, assuming that the switching timing is advanced such that each of the respective directions of energizing the first and second coils 4 and 5 is switched at an electrical advance angle of 90 degrees, the resulting motor torque is similar to that obtained in the case where the electrical advance angle is 0 degrees, as is apparent from hatching in FIG. 5C, and hence it is impossible to obtain a large rotational driving force.

In the present embodiment, the first to fourth magnetic sensors 8 to 11 are arranged in a positional relationship, described hereinafter, with respect to the first and second yokes 6 and 7, whereby it is possible to obtain a large rotational driving force even in the timing of switching each of the respective directions of energizing the first and second coils 4 and 5.

The operation of the motor 1 will be described with reference to FIG. 6. Note that the following description is given by defining a state shown in FIG. 6A as an initial state of the driving.

(A) Rotation in the Clockwise Direction
(A-i) Small Advance Angle Driving

A description will be given of an operation (first energization mode) for rotating the rotor 3 in the clockwise direction, by switching excitation of the first magnetic pole portions 6a in response to an output signal (output) from the first magnetic sensor 8, and switching excitation of the second magnetic pole portions 7a in response to an output signal (output) from the second magnetic sensor 9. The direction for rotating the rotor 3 in the clockwise direction is a first rotational direction. For this rotation, the energization direction is switched based on the following combination:

In a case where the first magnetic sensor 8 detects the S pole of the magnet 2, the first magnetic pole portions 6a are excited to the N pole, whereas in a case where the first magnetic sensor 8 detects the N pole of the magnet 2, the first magnetic pole portions 6a are excited to the S pole. In a case where the second magnetic sensor 9 detects the S pole of the magnet 2, the second magnetic pole portions 7a are excited to the S pole, whereas in a case where the second magnetic sensor 9 detects the N pole of the magnet 2, the second magnetic pole portions 7a are excited to the N pole.

Figure 6A:
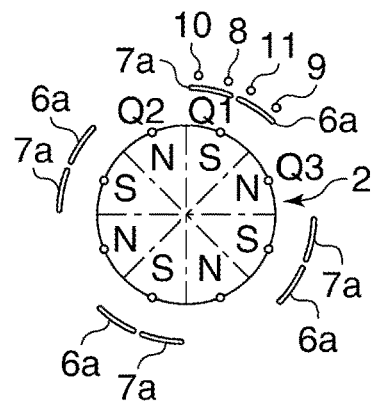
FIGS. 6A to 6I are cross-sectional views of the motor, taken along the direction perpendicular to the axis of the motor, which show phase relationships between the yokes, magnetic sensors, and the magnet.

In the state shown in FIG. 6A, the first magnetic sensor 8 and the second magnetic sensor 9 both detect the S pole of the magnet 2. Therefore, the first magnetic pole portions 6a are excited to the N pole, and the second magnetic pole portions 7a are excited to the S pole, and hence a rotational force for rotating the rotor 3 and the magnet 2 in the clockwise direction is generated. When the rotor 3 is rotated in the clockwise direction from the state shown in FIG. 6A, as shown in FIG. 6B, the center Q1 of each S pole of the magnet 2 and the center of each of the first magnetic pole portions 6a are opposed to each other.

Figure 6B:
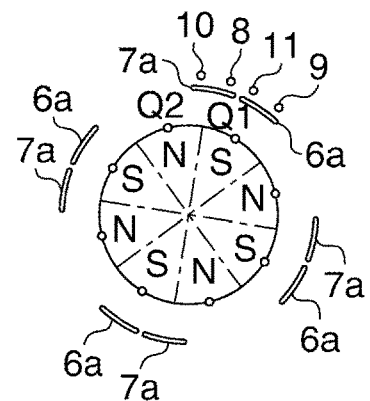
Figure 6C:
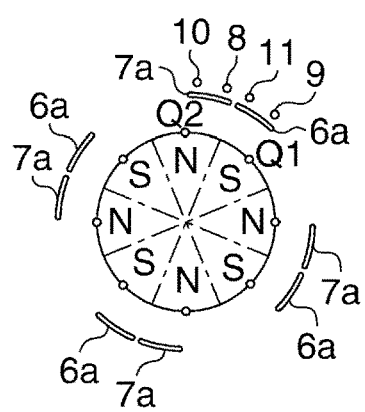

When the rotor 3 is rotated in the clockwise direction from the state shown in FIG. 6B, as shown in FIG. 6C, a distance between the center Q1 of each S pole of the magnet 2 and the opposed one of the first magnetic pole portions 6a becomes equal to a distance between the center Q2 of each N pole of the magnet 2, which is magnetized to a different pole from the pole having the center Q1, and an opposed one of the second magnetic pole portions 7a.

The first magnetic sensor 8 is disposed such that when switching the pole to which the first magnetic pole portions 6a are excited based on an output from the first magnetic sensor 8, the timing for switching excitation of the first magnetic pole portions 6a, with respect to the rotational position of the rotor 3, is in a range of electrical advance angles of 0 to 45 degrees. For this reason, the first magnetic sensor 8 detects the N pole of the magnet 2 while the magnet 2 is shifting from the state shown in FIG. 6B to the state shown in FIG. 6C.

Upon detection of the N pole by the first magnetic sensor 8, the first coil 4 is energized such that the first magnetic pole portions 6a are excited to the S pole. Further, since the second magnetic sensor 9 has detected the S pole of the magnet 2, the second coil 5 has been energized such that the second magnetic pole portions 7a are excited to the S pole. With this, a rotational force for rotating the rotor 3 and the magnet 2 in the clockwise direction is generated. When the rotor 3 is rotated in the clockwise direction from the state shown in FIG. 6C, as shown in FIG. 6D, the center Q2 of each N pole of the magnet 2 and the center of each of the second magnetic pole portions 7a are opposed to each other.

Figure 6D:
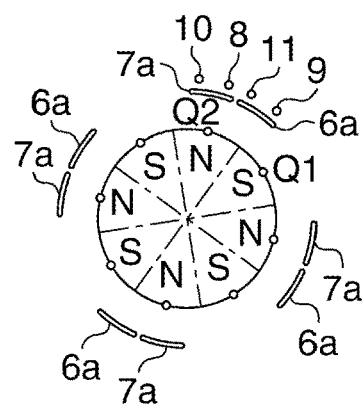
Figure 6E:
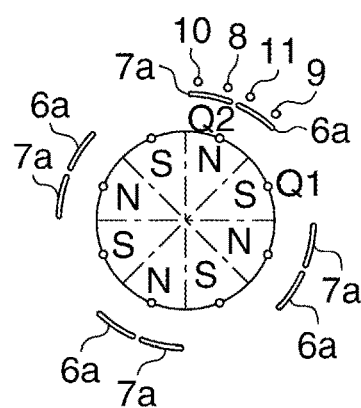

When the rotor 3 is rotated in the clockwise direction from the state shown in FIG. 6D, as shown in FIG. 6E, a distance between the center Q2 of each N pole of the magnet 2 and an opposed one of the first magnetic pole portions 6a becomes equal to a distance between the center Q2 of the same and an opposed one of the second magnetic pole portions 7a.

The second magnetic sensor 9 is disposed such that when switching the pole to which the second magnetic pole portions 7a are excited based on an output from the second magnetic sensor 9, the timing for switching excitation of the second magnetic pole portions 7a, with respect to the rotational position of the rotor 3, is in a range of the electrical advance angles of 0 to 45 degrees. For this reason, the second magnetic sensor 9 detects the N pole of the magnet 2 while the magnet 2 is shifting from the state shown in FIG. 6D to the state shown in FIG. 6E.

Upon detection of the N pole by the second magnetic sensor 9, the second coil 5 is energized such that the second magnetic pole portions 7a are excited to the N pole. Further, since the first magnetic sensor 8 has detected the N pole of the magnet 2, the first coil 4 has been energized such that the first magnetic pole portions 6a are excited to the S pole. With this, a rotational force for rotating the rotor 3 and the magnet 2 in the clockwise direction is generated. By sequentially switching the energization direction as described above, the rotor 3 and the magnet 2 are rotated in the clockwise direction.

As described above, for rotation in the clockwise direction, the first magnetic sensor 8 is disposed such that when switching the pole to which the first magnetic pole portions 6a are excited based on the output from the first magnetic sensor 8, the timing for switching excitation of the first magnetic pole portions 6a, with respect to the rotational position of the rotor 3, is in the range of electrical advance angles of 0 to 45 degrees. Further, the second magnetic sensor 9 is disposed such that when switching the pole to which the second magnetic pole portions 7a are excited based on the output from the second magnetic sensor 9, the timing for switching excitation of the second magnetic pole portions 7a, with respect to the rotational position of the rotor 3, is in the range of electrical advance angles of 0 to 45 degrees. Therefore, even when each of the respective directions of energizing the first and second coils 4 and 5 is switched based on the output from (result of detection by) an associated one of the first and second magnetic sensors 8 and 9, the phase difference from a case of direct current energization in which excitation is maintained without changing each of the respective directions of energizing the first and second coils 4 and 5 is small.

Therefore, there is no large difference in the phase of the rotor 3 and the magnet 2 between a case where the motor is driven by normal step driving and the case where the energization of the first and second coils 4 and 5 is switched based on the outputs from the first and second magnetic sensors 8 and 9. Therefore, even when the driving is switched between the step driving and brushless driving for feedback-controlling the outputs from the magnetic sensors, it is possible to perform a smooth switching operation without causing vibration or oscillation. Particularly, in a case of starting to drive the motor 1 from a stopped state, or in a case of causing the motor 1 to be shifted from a driven state to the stopped state, it is desirable to drive the motor 1 based on such an electrical advance angle.

(A-ii) Large Advance Angle Driving

When the rotational speed of the rotor 3 becomes high, time delay is generated in magnetizing the first and second magnetic pole portions 6a and 7a due to a counter electromotive force or inductance components of the first and second coils 4 and 5. Therefore, by switching each of the respective directions of energizing the first and second coils 4 and 5 earlier with respect to the rotational position of the rotor 3, it is possible to obtain a large rotational driving force.

Therefore, a description will be Liven of an operation (second energization mode) for rotating the rotor 3 in the clockwise direction, by switching the pole to which the first magnetic pole portions 6a are excited based on an output from the third magnetic sensor 10, and switching the pole to which the second magnetic pole portions 7a are excited based on an output from the fourth magnetic sensor 11.

In the second energization mode, the energization direction is switched based on the following combination: In a case where the third magnetic sensor 10 detects the S pole of the magnet 2, the first magnetic pole portions 6a are excited to the N pole, whereas in a case where the third magnetic sensor 10 detects the N pole of the magnet 2, the first magnetic pole portions 6a are excited to the S pole. In a case where the fourth magnetic sensor 11 detects the S pole of the magnet 2, the second magnetic pole portions 7a are excited to the S pole, whereas in a case where the fourth magnetic sensor 11 detects the N pole of the magnet 2, the second magnetic pole portions 7a are excited to the N pole.

In the state shown in FIG. 6A, the third magnetic sensor 10 and the fourth magnetic sensor 11 both detect the S pole of the magnet 2. Therefore, the first magnetic pole portions 6a are excited to the N pole, and the second magnetic pole portions 7a are excited to the S pole, and hence a rotational force for rotating the rotor 3 and the magnet 2 in the clockwise direction is generated. When the rotor 3 is rotated in the clockwise direction from the state shown in FIG. 6A, as shown in FIG. 6B, the center Q1 of each S pole of the magnet 2 and the center of each of the first magnetic pole portions 6a are opposed to each other.

The third magnetic sensor 10 is disposed such that when switching the pole to which the first magnetic pole portions 6a are excited based on the output from the third magnetic sensor 10, the timing for switching excitation of the first magnetic pole portions 6a, with respect to the rotational position of the rotor 3, is in a range of electrical advance angles of 45 to 90 degrees. For this reason, the third magnetic sensor 10 detects the N pole of the magnet 2 while the magnet 2 is shifting from the state shown in FIG. 6A to the state shown in FIG. 6B. Upon detection of the N pole by the third magnetic sensor 10, the first coil 4 is energized such that the first magnetic pole portions 6a are excited to the S pole.

Further, since the fourth magnetic sensor 11 has detected the S pole of the magnet 2, the second coil 5 has been energized such that the second magnetic pole portions 7a are excited to the S pole. With this, a rotational force for rotating the rotor 3 and the magnet 2 in the clockwise direction is generated. When the rotor 3 is rotated in the clockwise direction from the state shown in FIG. 6B, the state of the motor 1 is changed through the state shown in FIG. 6C to a state shown in FIG. 6D, in which the center Q2 of each N pole of the magnet 2 and the center of each of the second magnetic pole portions 7a are opposed to each other.

The fourth magnetic sensor 11 is disposed such that when switching the pole to which the second magnetic pole portions 7a are excited based on the output from the fourth magnetic sensor 11, the timing for switching excitation of the second magnetic pole portions 7a, with respect to the rotational position of the rotor 3, is in a range of electrical advance angles of 45 to 90 degrees. For this reason, the fourth magnetic sensor 11 detects the N pole of the magnet 2 while the magnet 2 is shifting from the state shown in FIG. 6C to the state shown in FIG. 6D. Upon detection of the N pole by the fourth magnetic sensor 11, the second coil 5 is energized such that the second magnetic pole portions 7a are excited to the N pole.

Further, since the third magnetic sensor 10 has detected the N pole of the magnet 2, the first coil 4 has been energized such that the first magnetic pole portions 6a are excited to the S pole. With this, a rotational force for rotating the rotor 3 and the magnet 2 in the clockwise direction is generated. By sequentially switching the energization direction as described above, the rotor 3 and the magnet 2 are rotated in the clockwise direction.

As described above, for rotation in the clockwise direction, the third magnetic sensor 10 is disposed such that when switching the pole to which the first magnetic pole portions 6a are excited based on the output from the third magnetic sensor 10, the timing for switching excitation of the first magnetic pole portions 6a, with respect to the rotational position of the rotor 3, is in the range of electrical advance angles of 45 to 90 degrees. Further, the fourth magnetic sensor 11 is disposed such that when switching the pole to which the second magnetic pole portions 7a are excited based on the output from the fourth magnetic sensor 11, the timing for switching excitation of the second magnetic pole portions 7a, with respect to the rotational position of the rotor 3, is in the range of electrical advance angles of 45 to 90 degrees.

Therefore, in a case where the rotor 3 is rotated at high speed, the magnetic pole portions are magnetized when the electrical advance angle has substantially approached 45 degrees, and hence it is possible to obtain a large rotational driving force. For this reason, in a case where the rotor 3 is rotated in the clockwise direction at high speed, it is desirable to drive the motor based on such an electrical advance angle.

(B) Counterclockwise Rotation (B-i) Small Advance Angle Driving

A description will be given of an operation (third energization mode) for rotating the rotor 3 in a counterclockwise direction, by switching excitation of the first magnetic pole portions 6a in response to the output signal (output) from the third magnetic sensor 10, and switching excitation of the second magnetic pole portions 7a in response to the output signal (output) from the fourth magnetic sensor 11. The direction for rotating the rotor 3 in the counterclockwise direction is a second rotational direction opposite to the first rotational direction.

In the third energization mode, the energization direction is switched based on the following combination: In a case where the third magnetic sensor 10 detects the S pole of the magnet 2, the first magnetic pole portions 6a are excited to the S pole, whereas in a case where the third magnetic sensor 10 detects the N pole of the magnet 2, the first magnetic pole portions 6a are excited to the N pole. In a case where the fourth magnetic sensor 11 detects the S pole of the magnet 2, the second magnetic pole portions 7a are excited to the N pole, whereas in a case where the fourth magnetic sensor 11 detects the N pole of the magnet 2, the second magnetic pole portions 7a are excited to the S pole.

In the state shown in FIG. 6A, the third magnetic sensor 10 and the fourth magnetic sensor 11 both detect the S pole of the magnet 2. Therefore, the first magnetic pole portions 6a are excited to the S pole, and the second magnetic pole portions 7a are excited to the N pole, and hence a rotational force for rotating the rotor 3 and the magnet 2 in the counterclockwise direction is generated. When the rotor 3 is rotated in the counterclockwise direction from the state shown in FIG. 6A, as shown in FIG. 6F, the center Q1 of each S pole of the magnet 2 and the center of each of the second magnetic pole portions 7a are opposed to each other.

Figure 6F:
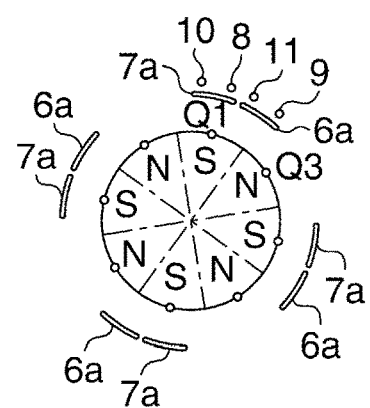
Figure 6G:
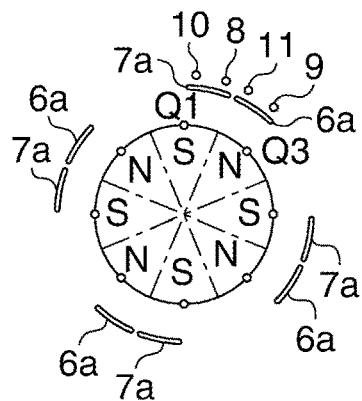

When the rotor 3 is rotated in the counterclockwise direction from the state shown in FIG. 6F, as shown in FIG. 6G, a distance between the center Q1 of each S pole of the magnet 2 and an opposed one of the second magnetic pole portions 7a becomes equal to a distance between the center Q3 of each N pole of the magnet 2, which is magnetized to a different pole from the pole having the center Q1, and an opposed one of the first magnetic pole portions 6a.

The fourth magnetic sensor 11 is disposed such that when switching the pole to which the second magnetic pole portions 7a are excited based on the output from the fourth magnetic sensor 11, the timing for switching excitation of the second magnetic pole portions 7a, with respect to the rotational position of the rotor 3, is in a range of electrical advance angles of 0 to 45 degrees. For this reason, the fourth magnetic sensor 11 detects the N pole of the magnet 2 while the magnet 2 is shifting from the state shown in FIG. 6F to the state shown in FIG. 6G.

Upon detection of the N pole by the fourth magnetic sensor 11, the second coil 5 is energized such that the second magnetic pole portions 7a are excited to the S pole. Further, since the third magnetic sensor 10 has detected the S pole of the magnet 2, the first coil 4 has been energized such that the first magnetic pole portions 6a are excited to the S pole. With this, a rotational force for rotating the rotor 3 and the magnet 2 in the counterclockwise direction is generated.

Figure 6H:
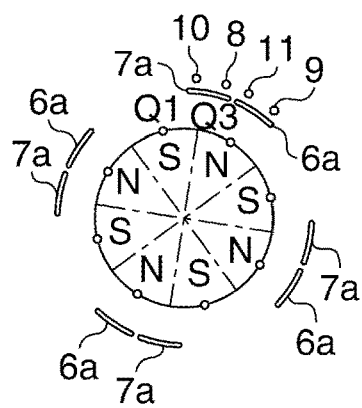
Figure 6I:
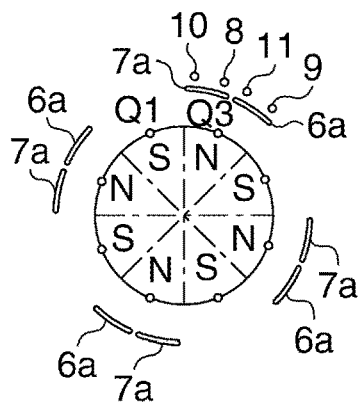

When the rotor 3 is rotated in the counterclockwise direction from the state shown in FIG. 6G, as shown in FIG. 6H, the center Q3 of each N pole of the magnet 2 and the center of each of the first magnetic pole portions 6a are opposed to each other. When the rotor 3 is rotated in the counterclockwise direction from the state shown in FIG. 6H, as shown in FIG. 6I, a distance between the center Q3 of each N pole of the magnet 2 and an opposed one of the first magnetic pole portions 6a becomes equal to a distance between the center Q3 of the pole of the same and an opposed one of the second magnetic pole portions 7a.

The third magnetic sensor 10 is disposed such that when switching the pole to which the first magnetic pole portions 6a are excited based on the output from the third magnetic sensor 10, the timing for switching excitation of the first magnetic pole portions 6a, with respect to the rotational position of the rotor 3, is in a range of electrical advance angles of 0 to 45 degrees. For this reason, the third magnetic sensor 10 detects the N pole of the magnet 2 while the magnet 2 is shifting from the state shown in FIG. 6H to the state shown in FIG. 6I.

Upon detection of the N pole by the third magnetic sensor 10, the first coil 4 is energized such that the first magnetic pole portions 6a are excited to the N pole. Further, since the fourth magnetic sensor 11 has detected the N pole of the magnet 2, the second coil 5 has been energized such that the second magnetic pole portions 7a are excited to the S pole. With this, a rotational force for rotating the rotor 3 and the magnet 2 in the counterclockwise direction is generated. By sequentially switching the energization direction as described above, the rotor 3 and the magnet 2 are rotated in the counterclockwise direction.

As described above, for rotation in the counterclockwise direction, the third magnetic sensor 10 is disposed such that when switching the pole to which the first magnetic pole portions 6a are excited based on the output from the third magnetic sensor 10, the timing for switching excitation of the first magnetic pole portions 6a, with respect to the rotational position of the rotor 3, is in the range of electrical advance angles of 0 to 45 degrees. Further, the fourth magnetic sensor 11 is disposed such that when switching the pole to which the second magnetic pole portions 7a are excited based on the output from the fourth magnetic sensor 11, the timing for switching excitation of the second magnetic pole portions 7a, with respect to the rotational position of the rotor 3, is in the range of electrical advance angles of 0 to 45 degrees.

Therefore, even when each of the respective directions of energizing the first and second coils 4 and 5 is switched based on the output from (result of detection by) an associated one of the third and fourth magnetic sensors 10 and 11, the phase difference from a case of direct current energization in which excitation is maintained without changing each of the respective directions of energizing the first and second coils 4 and 5 is small. Therefore, there is no lame difference in the phase of the rotor 3 and the magnet 2 between a case where the motor is driven by the normal step driving and the case where the energization of the first and second coils 4 and 5 is switched based on the outputs from the third and fourth magnetic sensors 10 and 11. Therefore, even when the step driving and the brushless driving for feedback-controlling the outputs from the magnetic sensors are switched, it is possible to perform a smooth switching operation without causing vibration and oscillation. Particularly, in a case of starting to drive the motor 1 from a stopped state, or in a case of causing the motor 1 to be shifted from a driven state to the stopped state, it is desirable to drive the motor 1 based on such an electrical advance angle.

(B-ii) Large Advance Angle Driving

When the rotational speed of the rotor 3 becomes high, time delay is generated in magnetizing the magnetic pole portions 6a and 7a due to a counter electromotive force or inductance components of the first and second coils 4 and 5. Therefore, by switching each of the respective directions of energizing the first and second coils 4 and 5 earlier with respect to the rotational position of the rotor 3, it is possible to obtain a large rotational driving force.

Therefore, a description will be given of an operation (fourth energization mode) for rotating the rotor 3 in the counterclockwise direction, by switching the pole to which the first magnetic pole portions 6a are excited based on the output from the first magnetic sensor 8, and switching the pole to which the second magnetic pole portions 7a are excited based on the output from the second magnetic sensor 9. In the fourth energization mode, the energization direction is switched based on the following combination:

In a case where the first magnetic sensor 8 detects the S pole of the magnet 2, the first magnetic pole portions 6a are excited to the S pole, whereas in a case where the first magnetic sensor 8 detects the N pole of the magnet 2, the first magnetic pole portions 6a are excited to the N pole. In a case where the second magnetic sensor 9 detects the S pole of the magnet 2, the second magnetic pole portions 7a are excited to the N pole, whereas in a case where the second magnetic sensor 9 detects the N pole of the magnet 2, the second magnetic pole portions 7a are excited to the S pole.

In the state shown in FIG. 6A, the first magnetic sensor 8 and the second magnetic sensor 9 both detect the S pole of the magnet 2. Therefore, the first magnetic pole portions 6a are excited to the S pole, and the second magnetic pole portions 7a are excited to the N pole, and hence a rotational force for rotating the rotor 3 and the magnet 2 in the counterclockwise direction is generated. When the rotor 3 is rotated in the counterclockwise direction from the state shown in FIG. 6A, as shown in FIG. 6F, the center Q1 of each S pole of the magnet 2 and the center of an associated one of the second magnetic pole portions 7a are opposed to each other.

The second magnetic sensor 9 is disposed such that when switching the pole to which the second magnetic pole portions 7a are excited based on the output from the second magnetic sensor 9, the timing for switching excitation of the second magnetic pole portions 7a, with respect to the rotational position of the rotor 3, is in a range of electrical advance angles of 45 to 90 degrees. For this reason, the second magnetic sensor 9 detects the N pole of the magnet 2 while the magnet 2 is shifting from the state shown in FIG. 6A to the state shown in FIG. 6F.

Upon detection of the N pole by the second magnetic sensor 9, the second coil 5 is energized such that the second magnetic pole portions 7a are excited to the S pole. Further, since the first magnetic sensor 8 has detected the S pole of the magnet 2, the first coil 4 has been energized such that the first magnetic pole portions 6a are excited to the S pole. With this, a rotational force for rotating the rotor 3 and the magnet 2 in the counterclockwise direction is generated. When the rotor 3 is rotated in the counterclockwise direction from the state shown in FIG. 6F, the state of the motor 1 is changed through the state shown in FIG. 6G to a state shown in FIG. 6H, in which the center Q3 of each N pole of the magnet 2 and the center of each of the first magnetic pole portions 6a are opposed to each other.

The first magnetic sensor 8 is disposed such that when switching the pole to which the first magnetic pole portions 6a are excited based on the output from the first magnetic sensor 8, the timing for switching excitation of the first magnetic pole portions 6a, with respect to the rotational position of the rotor 3, is in a range of electrical advance angles of 45 to 90 degrees. For this reason, the first magnetic sensor 8 detects the N pole of the magnet 2 while the magnet 2 is shifting from the state shown in FIG. 6G to the state shown in FIG. 6H.

Upon detection of the N pole by the first magnetic sensor 8, the first coil 4 is energized such that the first magnetic pole portions 6a are excited to the N pole. Further, since the second magnetic sensor 9 has detected the N pole of the magnet 2, the second coil 5 has been energized such that the second magnetic pole portions 7a are excited to the S pole. With this, a rotational force for rotating the rotor 3 and the magnet 2 in the counterclockwise direction is generated. By sequentially switching the energization direction as described above, the rotor 3 and the magnet 2 are rotated in the counterclockwise direction.

As described above, for rotation in the counterclockwise direction, the first magnetic sensor 8 is disposed such that when switching the pole to which the first magnetic pole portions 6a are excited based on the output from the first magnetic sensor 8, the timing for switching excitation of the first magnetic pole portions 6a, with respect to the rotational position of the rotor 3, is in the range of electrical advance angles of 45 to 90 degrees. Further, the second magnetic sensor 9 is disposed such that when switching the pole to which the second magnetic pole portions 7a are excited based on the output from the second magnetic sensor 9, the timing for switching excitation of the second magnetic pole portions 7a, with respect to the rotational position of the rotor 3, is in the range of electrical advance angles of 45 to 90 degrees.

Therefore, in a case where the rotor 3 is rotated at high speed, the magnetic pole portions 6a and 7a are magnetized when the electrical advance angle has substantially approached 45 degrees, and hence it is possible to obtain a large rotational driving force. Therefore, in a case where the rotor 3 is rotated in the counterclockwise direction at high speed, it is desirable to drive the motor based on such an electrical advance angle.

As described above, in the present embodiment, for rotation in the clockwise direction, the first magnetic sensor 8 is disposed such that when switching the pole to which the first magnetic pole portions 6a are excited based on the output from the first magnetic sensor 8, the timing for switching excitation of the first magnetic pole portions 6a, with respect to the rotational position of the rotor 3, is in the range of electrical advance angles of 0 to 45 degrees. Further, the second magnetic sensor 9 is disposed such that when switching the pole to which the second magnetic pole portions 7a are excited based on the output from the second magnetic sensor 9, the timing for switching excitation of the second magnetic pole portions 7a, with respect to the rotational position of the rotor 3, is in the range of electrical advance angles of 0 to 45 degrees.

Further, the third magnetic sensor 10 is disposed such that when switching the pole to which the first magnetic pole portions 6a are excited based on the output from the third magnetic sensor 10, the timing for switching excitation of the first magnetic pole portions 6a, with respect to the rotational position of the rotor 3, is in the range of electrical advance angles of 45 to 90 degrees. Further, the fourth magnetic sensor 11 is disposed such that when switching the pole to which the second magnetic pole portions 7a are excited based on the output from the fourth magnetic sensor 11, the timing for switching excitation of the second magnetic pole portions 7a, with respect to the rotational position of the rotor 3, is in the range of electrical advance angles of 45 to 90 degrees.

On the other hand, for rotation in the counterclockwise direction, the first magnetic sensor 8 is disposed such that when switching the pole to which the first magnetic pole portions 6a are excited based on the output from the first magnetic sensor 8, the timing for switching excitation of the first magnetic pole portions 6a, with respect to the rotational position of the rotor 3, is in the range of electrical advance angles of 45 to 90 degrees. Further, the second magnetic sensor 9 is disposed such that when switching the pole to which the second magnetic pole portions 7a are excited based on the output from the second magnetic sensor 9, the timing for switching excitation of the second magnetic pole portions 7a, with respect to the rotational position of the rotor 3, is in the range of electrical advance angles of 45 to 90 degrees.

Further, the third magnetic sensor 10 is disposed such that when switching the pole to which the first magnetic pole portions 6a are excited based on the output from the third magnetic sensor 10, the timing for switching excitation of the first magnetic pole portions 6a, with respect to the rotational position of the rotor 3, is in the range of electrical advance angles of 0 to 45 degrees. Further, the fourth magnetic sensor 11 is disposed such that when switching the pole to which the second magnetic pole portions 7a are excited based on the output from the fourth magnetic sensor 11 the timing for switching excitation of the second magnetic pole portions 7a, with respect to the rotational position of the rotor 3, is in the range of electrical advance angles of 0 to 45 degrees.

In actuality, it is necessary to dispose the first to fourth magnetic sensors 8 to 11 at respective positions in which a large rotational driving force is obtained, while considering a magnetization error of the magnet 2, dimensional tolerances of the first and second yokes 6 and 7, and so forth.

Therefore, for rotation in the clockwise direction, it is preferable that the first magnetic sensor 8 is disposed in a position where the timing for switching excitation of the first stator unit is in a range of electrical advance angles of 14.4 to 33.6 degrees. It is preferable that the third magnetic sensor 10 is disposed in a position where the timing for switching excitation of the first magnetic pole portions 6a is in a range of electrical advance angles of 56.4 to 75.6 degrees. It is preferable that the second magnetic sensor 9 is disposed in a position where the timing for switching excitation of the second magnetic pole portions 7a is in a range of electrical advance angles of 14.4 to 33.6 degrees. It is preferable that the fourth magnetic sensor 11 is disposed in a position where the timing for switching excitation of the second magnetic pole portions 7a is in a range of electrical advance angles of 56.4 to 75.6 degrees.

On the other hand, for rotation in the counterclockwise direction, it is preferable that the first magnetic sensor 8 is dispose in a position where the timing for switching excitation of the first magnetic pole portions 6a is in a range of electrical advance angles of 56.4 to 75.6 degrees. It is preferable that the third magnetic sensor 10 is disposed in a position where the timing for switching excitation of the first magnetic pole portions 6a is in a range of electrical advance angles of 14.4 to 33.6 degrees. It is preferable that the second magnetic sensor 9 is disposed in a position where the timing for switching excitation of the second magnetic pole portions 7a is in a range of electrical advance angles of 56.4 to 75.6 degrees. It is preferable that the fourth magnetic sensor 11 is disposed in a position where the timing for switching excitation of the second magnetic pole portions 7a is in a range of electrical advance angles of 14.4 to 33.6 degrees.

Further, to prevent the characteristics of rotation in the clockwise and counterclockwise directions from being spoiled, the first and third magnetic sensors 8 and 10 are disposed by taking into consideration the arrangement of the first and third magnetic sensors 8 and 10 such that the midpoint of a line segment connecting between the first magnetic sensor 8 and the third magnetic sensor 10 coincides with the timing for switching excitation of the first magnetic pole portions 6a, which is set to the electrical advance angle of 45 degrees. Similarly, the second and fourth magnetic sensors 9 and 11 are disposed by taking into consideration the arrangement of the second and fourth magnetic sensors 9 and 11 such that the midpoint of a line segment connecting between the second magnetic sensor 9 and the fourth magnetic sensor 11 coincides with the timing for switching excitation of the second magnetic pole portions 7a, which is se to the electrical advance angle of 45 degrees.

In the present embodiment, the sensor unit is used which has the first magnetic sensor 8 and the third magnetic sensor 10 as one unit, and the second magnetic sensor 9 and the fourth magnetic sensor 11 as one unit. In this case, for rotation in the clockwise direction, the first magnetic sensor 8 is disposed at a location where excitation of the first magnetic pole portions 6a is switched at an electrical advance angle of 21 degrees, and the third magnetic sensor 10 is disposed at a location where excitation of the first magnetic pole portions 6a is switched at an electrical advance angle of 69 degrees. Further, the second magnetic sensor 9 is disposed at a location where excitation of the second magnetic pole portions 7a is switched at an electrical advance angle of 21 degrees, and the fourth magnetic sensor 11 is disposed at a location where excitation of the second magnetic pole portions 7a is switched at an electrical advance angle of 69 degrees.

Next, the characteristic features of the motor driving apparatus according to the present embodiment will be described with reference to FIGS. 7 and 8.

(1) Large Advance Angle Driving

Figure 7:
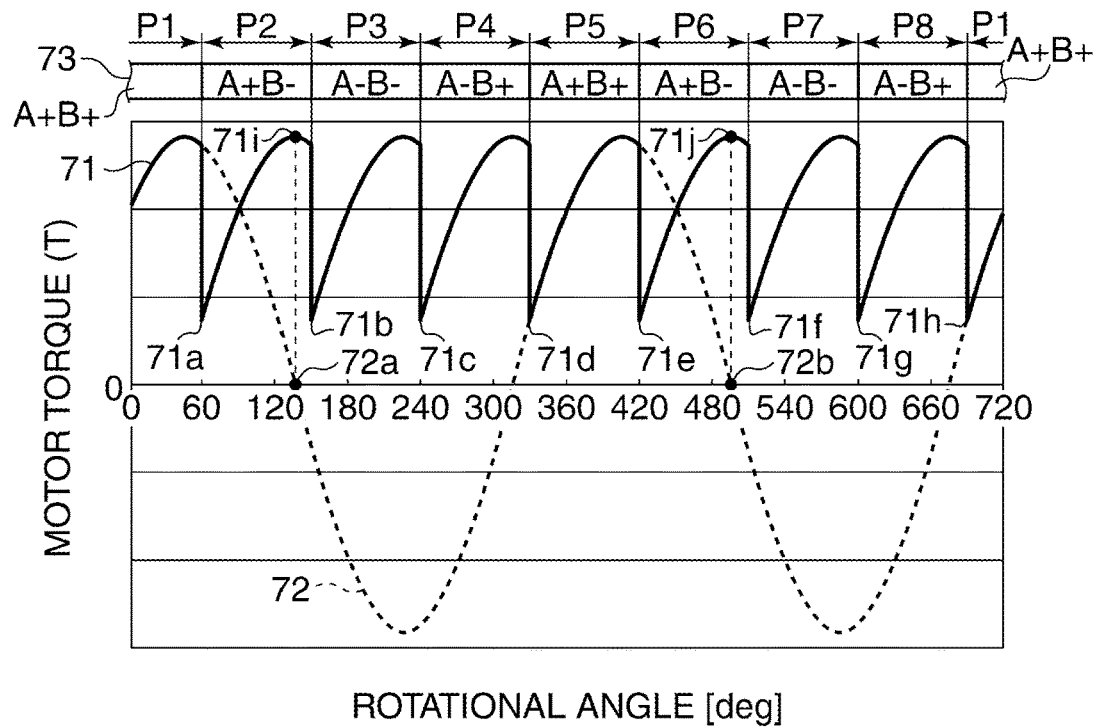
FIG. 7 is a graph showing motor torque generated during half rotation of the motor which is driven by large advance angle driving (through two-phase direct current energization).

FIG. 7 is a graph showing motor torque generated during half rotation of the motor when the motor 1 is driven by large advance angle driving, in which the horizontal axis represents a rotational angle expressed in an electrical angle, and the vertical axis represents motor torque. In the present embodiment, since the magnet 2 has the eight poles, the illustrated rotational angle range (720 degrees) corresponds to a mechanical angle range of 180 degrees.

Referring to FIG. 7, a section 73 indicates regions P1 to P8 of states of energization (each state set according to the outputs from the magnetic sensors assuming that the rotor 3 is stopped in each associated range). Further, in FIG. 7, the second magnetic pole portions 7a and the first magnetic pole portions 6a are represented by A and B, respectively, and respective states of energization of each coil causing excitation of associated magnetic pole portions to the N pole and the S pole are represented by signs + and −, respectively. Further, the positive direction of the rotational angle in FIG. 7 indicates the counterclockwise direction (CCW) of rotation.

A torque line 71 indicates a waveform of torque output from the motor 1 in a case where switching of energization as shown in the section 73 (sequential switching between the states of energization of P1 to P8) is performed (by two-phase energization). A torque line 72 indicates a waveform of torque output from the motor 1 in a case where direct current energization is performed in the state of energization of A+B+ (the second magnetic pole portions 7a and the first magnetic pole portions 6a are both excited to the N pole) without performing energization switching.

As indicated by the torque line 71, in the large advance angle driving, a ripple of the motor torque is larger than in the case of the electrical advance angle of 45 degrees, and the torque line 71 has portions where the drop of torque is locally noticeable (hereinafter referred to as the torque dropped portions) 71a to 71h. In FIG. 7, the torque dropped portions 71a to 71h periodically occur at respective rotational angles (electrical angles) of 60+90 (i−1) (i=1, 2, 3, . . . ) degrees, and 16 drops occur per one rotation (mechanical angle of 360 degrees, electrical angle of 1440 degrees). If the load torque of a driven member is larger than a torque value at each of the torque dropped portions 71a to 71h, the motor 1 cannot be started from the rotational angles corresponding to the torque dropped portions 71a to 71h.

Therefore, when designing the drive mechanism, it is necessary to design the drive mechanism such that the maximum load torque value of the driven member in the driving region is smaller than the torque values at the torque dropped portions 71a to 71h. Alternatively, it is necessary to make the torque values at the torque dropped portions 71a to 71h larger than the maximum load torque value of the driven member by increasing the driving voltage to thereby increase the whole output of the motor 1. However, this places a restriction on the design of the motor 1, and leads to a lower degree of freedom in design, and an increase in power consumption.

To overcome this problem, in the present embodiment, for large advance angle driving, the start of the motor 1 at the torque dropped portions 71a to 71h is avoided to thereby make it possible to start the motor 1 at a rotational angle at which sufficient torque can be always obtained. This driving of the motor will be described in detail hereafter.

First, in the regions P1 to P4, the combinations of A and B, and + and − are all different. That is, the four combinations of the states of energization of the first and second coils 4 and 5 in the regions P1 to P4 are all different from each other. This means that the combinations of signals output from a pair of sensors, used in each associated energization mode, out of the first to fourth magnetic sensors 8 to 11, in the regions P1 to P4, are all different from each other. The motor 1 repeats these four combinations of the states of energization of the first and second coils 4 and 5, and hence the states of energization in the regions P5 to P8 in FIG. 7 are the same as those in the regions P1 to P4. Therefore, it is possible to detect, from a combination of a pair of output signals from a pair of sensors, used in each associated energization mode, out of the first to fourth magnetic sensors 8 to 11, which of the states of energization (A+B+, A+B−, A−B−, and A−B+) of the four regions the rotor 3 in the stopped state is in.

Here, let us consider a case where the rotor 3 is stopped at a rotational angle included in the region P2 (a range of rotational angles of 60 to 150 degrees in FIG. 7). To start the motor 1 in this region P2, it is necessary to perform energization in the state of energization of A+B− based on the outputs from the pair in use out of the first to fourth magnetic sensors 8 to 11. However, if the rotor 3 is stopped in the vicinity of a rotational angle of 60 degrees or 150 degrees, generation of the motor torque is started from this position, and hence the motor 1 is to be started at the torque dropped portion 71a or 71b.

To prevent the motor 1 from being started at the torque dropped portion 71a or 71b, before starting the motor 1 in the state of energization of A+B−, direct current energization (energization without switching coil energization) is performed in the state of energization of A+B+ which is the state of energization in the region P1 preceding by one region the region P2 with respect to the CCW direction.

At this time, although the torque changes as indicated by the torque line 72, and the rotor 3 is to be stopped at rotational angles corresponding to points 72a and 72b, the point 72a in the region P2 is closer in the rotational angle to the position where the rotor 3 was stopped before direct current energization than the point 72*b*, and hence direct current energization in the state of energization of A+B+ causes the rotor 3 to be moved to the point 72*a* (rotational angle of 135 degrees) and stopped. After that, in the present embodiment, energization of the first and second coils 4 and 5 is performed in the state of energization of A+B− from this stopped position (point 72*a*). This makes the motor torque high, as indicated by a point 71*i*, and hence it is possible to start the motor 1 with high motor torque. That is, it is possible to provide sufficient motor torque for the load of the driven member, and hence it is possible to reliably start the motor 1.

Although the above description is given of the case where the rotor 3 is stopped in the region P2 by way of example, even when the rotor 3 is stopped in another region, it is possible to reliably start the motor 1 using the above-described method. That is, by performing direct current energization in a state of energization preceding by one state the state of energization associated with the start time of the motor 1 in the rotational direction, it is possible to reliably start the motor 1. For example, in a case where the rotor 3 is stopped in the region P3, direct current energization is performed in the state of energization of A+B−, in a case where the rotor 3 is stopped in the region P4, direct current energization is performed in the state of energization of A−B−, and in a case where the rotor 3 is stopped in the region P5, direct current energization is performed in the state of energization of A−B+, and then the motor 1 is started in the state of energization associated with the start time of the motor 1, whereby it is possible to avoid the start at a torque dropped portion. This makes it possible to reliably start the motor 1.

Although the above description is given by taking the rotation in the CCW direction as an example, it is also possible to reliably start the motor 1 by using the same method for the rotation in a CW (clockwise) direction. Further, although in the present embodiment, before starting the motor 1, direct current energization is performed in a state of energization preceding by one state the state of energization associated with the start time of the motor 1 with respect to the rotational direction, this is to cause a stopped position (rotational angle) where the rotor 3 is stopped by direct current energization executed in the state of energization preceding by one state in the rotational direction to be included in the region of the state of energization associated with the start time of the motor 1 (region where the rotor 3 was stopped before the start). By doing this, it is possible to reduce the difference between the stopped positions of the rotor 3 before and after execution of direct current energization.

This makes it possible to prevent, assuming that the motor driving apparatus is equipped in a drive mechanism, the drive mechanism connected to the motor 1 from being largely moved by execution of direct current energization before the start. If the drive mechanism can be prevented from moving before the start even when there is a large positional shift of the rotor 3 before and after execution of direct current energization, the state of energization in direct current energization is not limited to the state of energization preceding by one state the state of energization associated with the start time of the motor 1 with respect to the rotational direction, but may be a desired state of energization. In this case, it is necessary to start the motor 1 in a state of energization of the first and second coils 4 and 5 corresponding to the stopped position of the rotor 3 after execution of direct current energization.

(2) Small Advance Angle Driving

Figure 8:
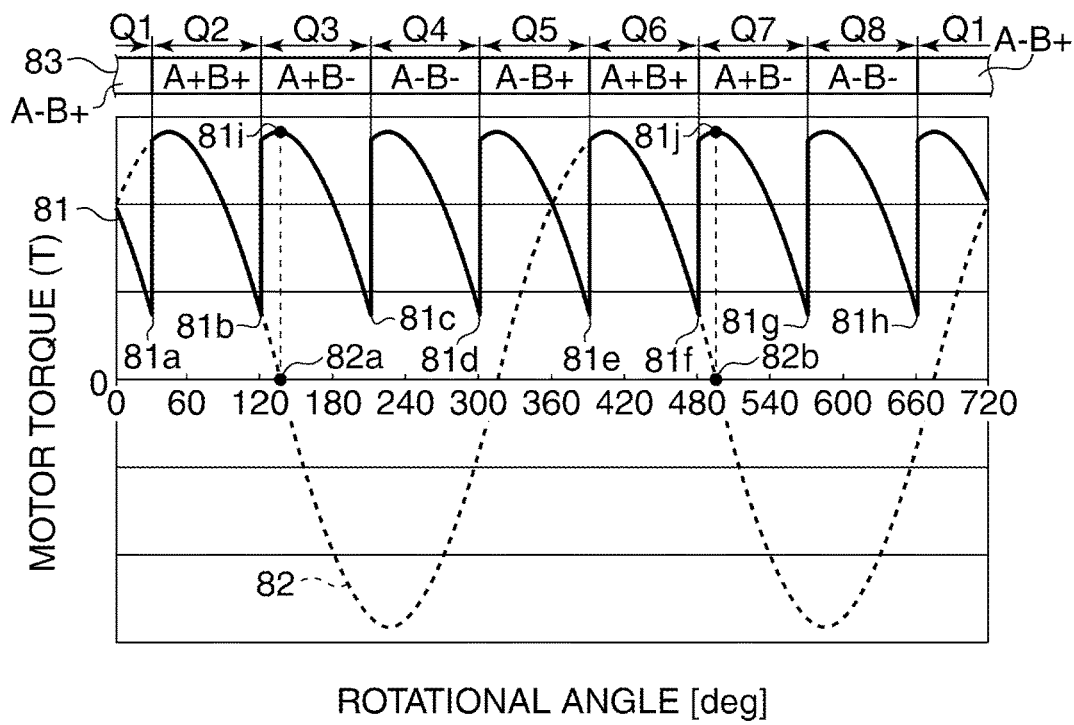
FIG. 8 is a graph showing motor torque generated during half rotation of the motor when the motor is driven by small advance angle driving (through two-phase direct current energization).

FIG. 8 is a graph showing motor torque generated during half rotation of the motor when the motor is driven by small advance angle driving. Referring to FIG. 8, the horizontal axis represents a rotational angle expressed in an electrical angle, and the vertical axis represents motor torque. In the present embodiment, since the magnet 2 has the eight poles, the illustrated rotational angle range (720 degrees) corresponds to a mechanical angle range of 180 degrees.

A section 83 indicates regions Q1 to Q8 of states of energization, and in this graph as well, the second magnetic pole portions 7*a* and the first magnetic pole portions 6*a* are represented by A and B, respectively, and respective states of energization of each coil causing excitation of associated magnetic pole portions to the N pole and the S pole are represented by signs + and −, respectively. Further, the positive direction of the rotational angle in FIG. 8 indicates the counterclockwise direction (CCW) of rotation.

A torque line 81 indicates a waveform of torque output from the motor 1 in a case where switching of energization as shown in the section 83 (sequential switching between the states of energization of Q1 to Q8) is performed (two-phase energization). A torque line 82 indicates a waveform of torque output from the motor 1 in a case where direct current energization is performed in the state of energization of A+B+ (the second magnetic pole portions 7*a* and the first magnetic pole portions 6*a* are both excited to the N pole) without performing energization switching.

As indicated by the torque line 81, in the small advance angle driving, a ripple of the motor torque is larger than in the case of the electrical advance angle of 45 degrees, and the torque line 81 has torque dropped portions 81*a* to 81*h*. In FIG. 8, the torque dropped portions 81*a* to 81*h* periodically occur at respective rotational angles (electrical angles) of 30+90 (i−1) (i=1, 2, 3, . . . ), and 16 drops occur per one rotation (the mechanical angle of 360 degrees, the electrical angle of 1440 degrees). If the load torque of a driven member is larger than a torque value at each of the torque dropped portions 81*a* to 81*h*, the motor 1 cannot be started from the rotational angles corresponding to the torque dropped portions 81*a* to 81*h*.

Therefore, when designing the drive mechanism, it is necessary to design the drive mechanism such that the maximum load torque value of the driven member in the driving range is smaller than the torque values at the torque dropped portions 81*a* to 81*h*. Alternatively, it is necessary to make the torque values at the torque dropped portions 81*a* to 81*h* larger than the maximum load torque value of the driven member by increasing the driving voltage to thereby increase the whole output of the motor 1. However, this places a restriction on the design of the motor 1, and leads to a lower degree of freedom in design, and an increases in power consumption.

To overcome this problem, for small advance angle driving as well, the start of the motor 1 at the torque dropped portion is avoided to thereby make it possible to start the motor 1 at a rotational angle at which sufficient torque can be always obtained. This driving of the motor will be described in detail hereafter.

First, in the regions Q1 to Q4, the combinations of A and B, and + and − are all different. That is, the four combinations of the states of energization of the first and second coils 4 and 5 in the regions Q1 to Q4 are all different from each other. This means that the combinations of signals output from a pair of sensors, used in each associated energization mode, out of the first to fourth magnetic sensors 8 to 11, in the regions Q1 to Q4, are all different from each other. The motor 1 repeats these four combinations of the states of energization of the first and second coils 4 and 5, and hence the states of energization in the regions Q5 to Q8 in FIG. 8 are the same as those in the regions Q1 to Q4. Therefore, it is possible to detect, from a combination of a pair of output signals from a pair of sensors, used in each associated energization mode, out of the first to fourth magnetic sensors 8 to 11, which of the states of energization (A+B+, A+B−, A−B−, and A−B+) of the four regions the rotor 3 in the stopped state is in.

Here, let us consider a case where the rotor 3 is stopped at a rotational angle included in the region Q3 (a range of rotational angles of 120 to 210 degrees in FIG. 8). To start the motor 1 in this region Q3, it is necessary to perform energization in the state of energization of A+B− based on the outputs from the pair in use out of the first to fourth magnetic sensors 8 to 11. However, if the rotor 3 is stopped in the vicinity of a rotational angle of 120 degrees or 210 degrees, generation of the motor torque is started from this position, and hence the motor 1 is to be started at the torque dropped portion 81b or 81c.

To prevent the motor 1 from being started at the torque dropped portion 81b or 81c, before starting the motor 1 in the state of energization of A+B−, direct current energization (energization without switching coil energization) is performed in the state of energization of A+B+ which is the state of energization in the region Q2 preceding by one region the region Q3 with respect to the CCW direction. At this time, although the torque changes as indicated by the torque line 82, and the rotor 3 is to be stopped at rotational angles corresponding to points 82a and 82b, the point 82a in the region Q3 is closer in the rotational angle to the position where the rotor 3 was stopped before direct current energization than the point 82b, and hence direct current energization in the state of energization of A+B+ causes the rotor 3 to be moved to the point 82a (rotational angle of 135 degrees) and stopped.

After that, in the present embodiment, energization of the first and second coils 4 is performed in the state of energization of A+B− from this stopped position (point 82a). This makes the motor torque high, as indicated by a point 81i, and hence it is possible to start the motor 1 with high motor torque. That is, it is possible to provide sufficient motor torque for the load of the driven member, and hence it is possible to reliably start the motor 1.

Although the above description is given of the case where the rotor 3 is stopped in the region Q2 by way of example, even when the rotor 3 is stopped in another region, it is possible to reliably start the motor 1 using the above-described method. That is, by performing direct current energization in a state of energization preceding by one state the state of energization associated with the start time of the motor 1 in the rotational direction, it is possible to reliably start the motor 1. For example, in a case where the rotor 3 is stopped in the region Q4, direct current energization is performed in the state of energization of A+B−, in a case where the rotor 3 is stopped in the region Q5, direct current energization is performed in the state of energization of A−B−, and in a case where the rotor 3 is stopped in the region Q6, direct current energization is performed in the state of energization of A−B+, and then the motor 1 is started in the state of energization associated with the start time of the motor 1, whereby it is possible to avoid the start at a torque dropped portion. This makes it possible to reliably start the motor 1. Although the above description is given by taking the rotation in the CCW direction as an example, it is also possible to reliably start the motor 1 by using the same method for the rotation in the CW direction.

As described above, in the present embodiment, before starting the motor 1 in a state of energization determined based on a pair of signals output from a pair of sensors, used in each associated energization mode, out of the first to fourth magnetic sensors 8 to 11, direct current energization is performed in a state of energization preceding by one state the above-mentioned state of energization associated with the start time of the motor 1 with respect to the rotational direction, whereby it is possible to avoid the start at a rotational angle of a torque dropped portion. This avoids the start from a lower limit value of an output torque ripple, whereby it is possible to provide a motor driving apparatus that is capable of reliably starting a motor even when the driving load of the motor is relatively large.

Further, although in the present embodiment, the description is given of the example in which before starting the motor 1, direct current energization is performed in a state of energization preceding by one state the state of energization associated with the start time of the motor 1 with respect to the rotational direction, this is to cause a stopped position (rotational angle) where the rotor 3 is stopped by direct current energization executed in the state of energization preceding by one state in the rotational direction to be included in the region of the state of energization associated with the start time of the motor 1 (region where the rotor 3 was stopped before the start). By doing this, it is possible to reduce the difference between the stopped positions of the rotor 3 before and after execution of direct current energization.

This makes it possible to prevent, assuming that the motor driving apparatus is equipped in a drive mechanism, the drive mechanism connected to the motor 1 from being largely moved by execution of direct current energization before the start. If the drive mechanism can be prevented from moving before the start even when there is a large positional shift of the rotor 3 before and after execution of direct current energization, the state of energization in direct current energization is not limited to the state of energization preceding by one state the state of energization associated with the start time of the motor 1 with respect to the rotational direction, but may be a desired state of energization. In this case, it is necessary to start the motor 1 in the state of energization of the first and second coils 4 and 5 corresponding to the stopped position of the rotor 3 after execution of direct current energization (corresponding to the signals output from magnetic sensors in use).

Next, a description will be Liven of a motor driving apparatus according to a second embodiment of the present invention with reference to FIGS. 9 and 10. Note that the same component elements as those of the first embodiment are described with reference to the same figures and using the same reference numerals. Although in the first embodiment, the start at a rotational angle of a torque dropped portion is avoided by performing two-phase (multiple phase) direct current energization before starting the motor 1, even when single-phase direct current energization is performed before starting the motor 1, it is possible to obtain the same advantageous effects.

(1) Large Advance Angle Driving

Figure 9A:
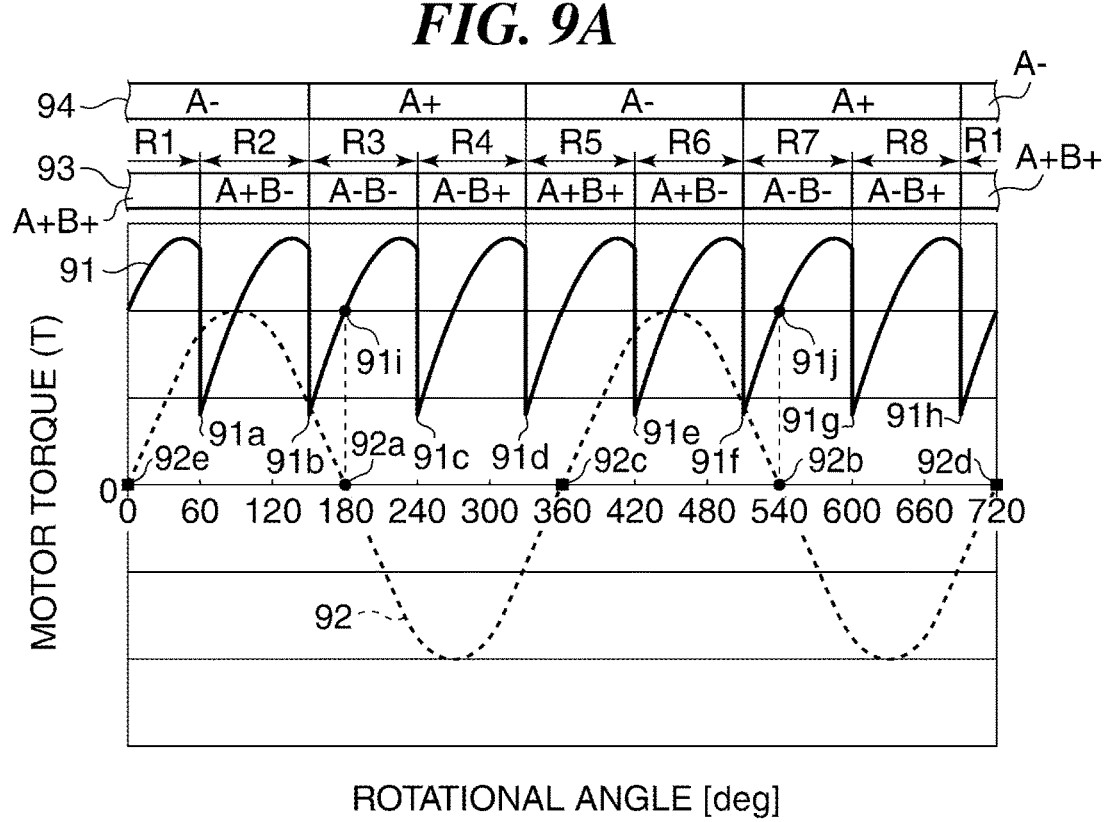
FIGS. 9A and 9B are graphs each showing motor torque generated during half rotation of the motor when in a motor driving apparatus according to a second embodiment of the present invention drives the motor by large advance angle driving (through single-phase direct current energization).
Figure 9B:
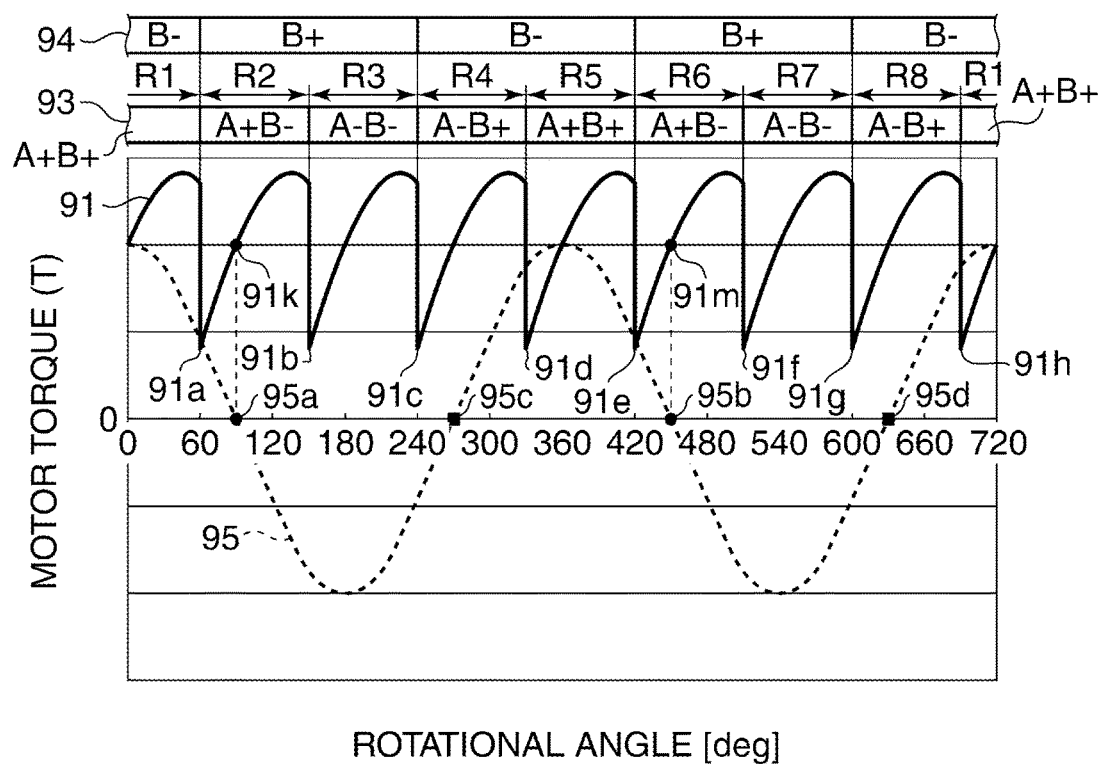

FIGS. 9A and 9B are graphs each showing motor torque generated during half rotation of the motor when the motor is driven by large advance angle driving. Referring to FIG. 9, the horizontal axis represents a rotational angle expressed in an electrical angle, and the vertical axis represents motor torque. In the present embodiment as well, since the magnet 2 has the eight poles, the illustrated rotational angle range (720 degrees) corresponds to a mechanical angle range of 180 degrees.

A section 93 in FIGS. 9A and 9B indicates regions R1 to R8 of states of energization, and in these graphs as well, the second magnetic pole portions 7a and the first magnetic pole portions 6a are represented by A and B, respectively, and respective states of energization of each coil causing excitation of associated magnetic pole portions to the N pole and the S pole are represented by signs + and −, respectively. In addition, a section 94 indicates a state of energization of coils in single-phase direct current energization, described hereinafter. Further, the positive direction of the rotational angle in FIG. 9A indicates the counterclockwise direction (CCW) of rotation.

A torque line 91 indicates a waveform of torque output from the motor 1 in a case where switching of energization as shown in the section 93 (sequential switching between the states of energization of R1 to R8) is performed (two-phase energization). A torque line 92 appearing in FIG. 9A indicates a waveform of torque output from the motor 1 in a case where direct current energization is performed in a state of energization of A+ (the second magnetic pole portions 7a are excited to the N pole, and the first magnetic pole portions 6a (for B-phase) are not excited) without performing energization switching.

As indicated by the torque line 91, in the large advance angle driving, a ripple of the motor torque is larger than in the case of the electrical advance angle of 45 degrees, and the torque line 91 has portions where the drop of torque is locally noticeable (hereinafter referred to as the torque dropped portions) 91a to 91h. In FIGS. 9A and 9B, the torque dropped portions 91a to 91h periodically occur at respective rotational angles (electrical angles) of 60+90 (i−1) (i=1, 2, 3, . . . ) degrees, and 16 drops occur per one rotation (the mechanical angle of 360 degrees, the electrical angle of 1440 degrees). If the load torque of a driven member is larger than a torque value at each of the torque dropped portions 91a to 91h, the motor 1 cannot be started from the rotational angles corresponding to the torque dropped portions 91a to 91h.

Therefore, when designing the drive mechanism, it is necessary to design the drive mechanism such that the maximum load torque value of the driven member in the driving region is smaller than the torque values at the torque dropped portions 91a to 91h. Alternatively, it is necessary to make the torque values at the torque dropped portions 91a to 91h larger than the maximum load torque of the driven member by increasing the driving voltage to thereby increase the whole output of the motor 1. However, this places a restriction on the design of the motor 1, and leads to a lower degree of freedom in design, and an increase in power consumption.

To overcome this problem, in the present embodiment, for large advance angle driving, the start of the motor 1 at the torque dropped portion 91a to 91h is avoided to thereby make it possible to start the motor 1 at a rotational angle at which sufficient torque can be always obtained. This driving of the motor will be described in detail hereafter.

First, in the regions R1 to R4, the combinations of A and B, and + and − are all different. That is, the four combinations of the states of energization of the first and second coils 4 and 5 in the regions R1 to R4 are all different from each other. This means that the combinations of signals output from a pair of sensors, used in each associated energization mode, out of the first to fourth magnetic sensors 8 to 11, in the regions R1 to R4, are all different from each other. The motor 1 repeats these four combinations of the states of energization of the first and second coils 4 and 5, and hence the states of energization in the regions R5 to R8 in FIGS. 9A and 9B are the same as those in the regions R1 to R4. Therefore, it is possible to detect, from a combination of a pair of output signals from a pair of sensors, used in each associated energization mode, out of the first to fourth magnetic sensors 8 to 11, which of the states of energization (A+B+, A+B−, A−B−, and A−B+) of the four regions the rotor 3 in the stopped state is in.

Here, let us consider a case where the rotor 3 is stopped at a rotational angle included in the region R3 (a range of rotational angles of 150 to 240 degrees in FIG. 9A). To start the motor 1 in this region R3, it is necessary to perform energization in the state of energization of A−B− based on the outputs from the pair in use out of the first to fourth magnetic sensors 8 to 11. However, if the rotor 3 is stopped in the vicinity of a rotational angle of 150 degrees or 240 degrees, generation of the motor torque is started from this position, and hence the motor 1 is to be started at the torque dropped portion 91b or 91c.

To avoid the motor 1 from being started at the torque dropped portion 91b or 91c, before starting the motor 1 in the state of energization of A−B−, direct current energization (energization without switching coil energization) is performed in the state of energization of A+ in a single phase with a different polarity. At this time, although the torque changes as indicated by the torque line 92, and the rotor 3 is to be stopped at rotational angles corresponding to points 92a and 92b, the point 92a in the region R3 is closer in the rotational angle to the position where the rotor 3 was stopped before direct current energization than the point 92b, and hence the rotor 3 is moved to the point 92a (rotational angle 180 degrees) and stopped.

After that, in the present embodiment, energization of the first and second coils 4 is performed in the state of energization of A−B− from this stopped position (point 92a). This makes the motor torque high, as indicated by a point 91i, and hence it is possible to start the motor 1 with high motor torque. That is, it is possible to provide sufficient motor torque for the load of the driven member, and hence it is possible to reliably start the motor 1.

Although the above description is given of the case where the rotor 3 is stopped in the region R3 by way of example, even when the rotor 3 is stopped in another region, it is possible to reliably start the motor 1 using the above-described method. That is, by performing direct current energization in A-phase with a different polarity from the state of energization associated with the start time of the motor 1, it is possible to reliably start the motor 1. For example, in a case where the rotor 3 is stopped in the region R4, direct current energization is performed in the state of energization of A+, in a case where the rotor 3 is stopped in the region R5, direct current energization is performed in the state of energization of A−, and in a case where the rotor 3 is stopped in the region R6, direct current energization is performed in the state of energization of A−, and then the motor 1 is started in the state of energization associated with the start time of the motor 1 whereby it is possible to avoid the start at a torque dropped portion. This makes it possible to reliably start the motor 1. Note that when direct current energization is performed in the state of energization of A−, the motor torque generated thereby forms a torque line which is reversed in polarity from the torque line 92. In this case, the rotor 3 is stopped at a point 92e (rotational angle of 0 degrees), a point 92c (rotational angle of 360 degrees), and a point 92d (rotational angle of 720 degrees).

Although the above description is given of direct current energization in A-phase, it is also possible to reliably start the motor 1 with respect to direct current energization in B-phase by performing the same method. The following description will be given of the direct current energization in B-phase in detail. The same component elements as those in FIG. 9A are denoted by the same reference numerals, and description thereof is omitted.

The positive direction of the rotational angle in FIG. 9B indicates the counterclockwise direction (CCW) of rotation. A torque line 95 indicates a waveform of torque output from the motor 1 in a case where direct current energization is performed in the state of energization of B+ without performing energization switching (the first magnetic pole portions 6a (for B-phase) are excited to the N pole, and the second magnetic pole portions 7a (for A-phase) are not excited).

Here, let us consider a case where the rotor 3 is stopped at a rotational angle included in the region R2 (a range of rotational angles of 60 to 150 degrees in FIG. 9B). To start the motor 1 in this region R2, it is necessary to perform energization in the state of energization of A+B− based on the outputs from the pair in use out of the first to fourth magnetic sensors 8 to 11. However, if the rotor 3 is stopped in the vicinity of a rotational angle of 60 degrees or 150 degrees, generation of the motor torque is started from this position, and hence the motor 1 is to be started at the torque dropped portion 91a or 91b.

To avoid the motor 1 from being started at the torque dropped portion 91a or 91b, before starting the motor 1 in the state of energization of A+B−, direct current energization (energization without switching coil energization) is performed in the state of energization of B+ in a single phase with a different polarity. At this time, although the torque changes as indicated by the torque line 95, and the rotor 3 is to be stopped at rotational angles corresponding to points 95a and 95b, the point 95a in the region R2 is closer in the rotational angle to the position where the rotor 3 was stopped before direct current energization than the point 95b, and hence the rotor 3 is moved to the point 95a (rotational angle of 90 degrees) and stopped.

After that, in the present embodiment, energization of the first and second coils 4 is performed in the state of energization of A+B− from this stopped position (point 95a). This makes the motor torque high, as indicated by a point 91k, and hence it is possible to start the motor 1 with high motor torque. That is, it is possible to provide sufficient motor torque for the load of the driven member, and hence it is possible to reliably start the motor 1.

Although the above description is given of the case where the rotor 3 is stopped in the region R2 by way of example, even when the rotor 3 is stopped in another region, it is possible to reliably start the motor 1 using the above-described method. That is, by performing direct current energization in a state of energization in B-phase with a different polarity from the state of energization associated with the start time of the motor 1, it is possible to reliably start the motor 1. For example, in a case where the rotor 3 is stopped in the region R3, direct current energization is performed in the state of energization of B+, in a case where the rotor 3 is stopped in the region R4, direct current energization is performed in the state of energization of B−, and in a case where the rotor 3 is stopped in the region R5, direct current energization is performed in the state of energization of B−, and then the motor 1 is started in the state of energization associated with the start time of the motor 1, whereby it is possible to avoid the start at a torque dropped portion. This makes it possible to reliably start the motor 1. Note that when direct current energization is performed in the state of energization of B−, the motor torque generated thereby forms a torque line which is reversed in polarity from the torque line 95. In this case, the rotor 3 is stopped at a point 95c (rotational angle of 270 degrees) and a point 95d (rotational angle of 630 degrees).

Incidentally, the positions where the rotor 3 is stopped when the above-mentioned A-phase (A+ or A−) direct current energization is performed are at rotational angles of 0 degrees, 180 degrees, 360 degrees, 540 degrees, and 720 degrees. The positions where the rotor 3 is stopped when the above-mentioned B-phase (B+ or B−) direct current energization is performed are at rotational angles of 90 degrees, 270 degrees, 450 degrees, and 630 degrees. That is, considering A-phase (A+ or A−) direct current energization time and B-phase (B+ or B−) direct current energization time, one stopped position is necessarily included in each of the regions R1 to R8. Therefore, by selecting A-phase direct current energization or B-phase direct current energization according to a region in which the rotor 3 is stopped before execution of direct current energization (one of the regions R1 to R8), it is possible to cause the rotor to be stopped in the same region before and after execution of direct current energization, and reduce the difference between the stopped positions of the rotor 3.

For example, in a case where the rotor 3 is stopped in the region R1 before execution of direct current energization, it is only required to select direct current energization in the state of energization of A− to thereby cause the rotor 3 to be stopped at a rotational angle of 0 degrees, and in a case where the rotor 3 is stopped in the region R2, it is only required to select direct current energization in the state of energization of B+ to thereby cause the rotor 3 to be stopped at a rotational angle of 90 degrees. Further, in a case where the rotor 3 is stopped in the region R3, it is only required to select direct current energization in the state of energization of A+ to thereby cause the rotor 3 to be stopped at a rotational angle of 180 degrees, and in a case where the rotor 3 is stopped in the region R4, it is only required to select direct current energization in the state of energization of B− to thereby cause the rotor 3 to be stopped at a rotational angle of 270 degrees.

Note that if the drive mechanism is configured to be capable of coping with a large shift in the stopped position of the rotor 3 before and after execution of direct current energization, the motor 1 may be started according to the stopped position of the rotor 3 after performing desired single-phase direct current energization. Further, although the above description is given by taking the rotation in the CCW direction as an example, it is also possible to reliably start the motor 1 by using the same method for the rotation in the CW direction.

(2) Small Advance Angle Driving

Figure 10A:
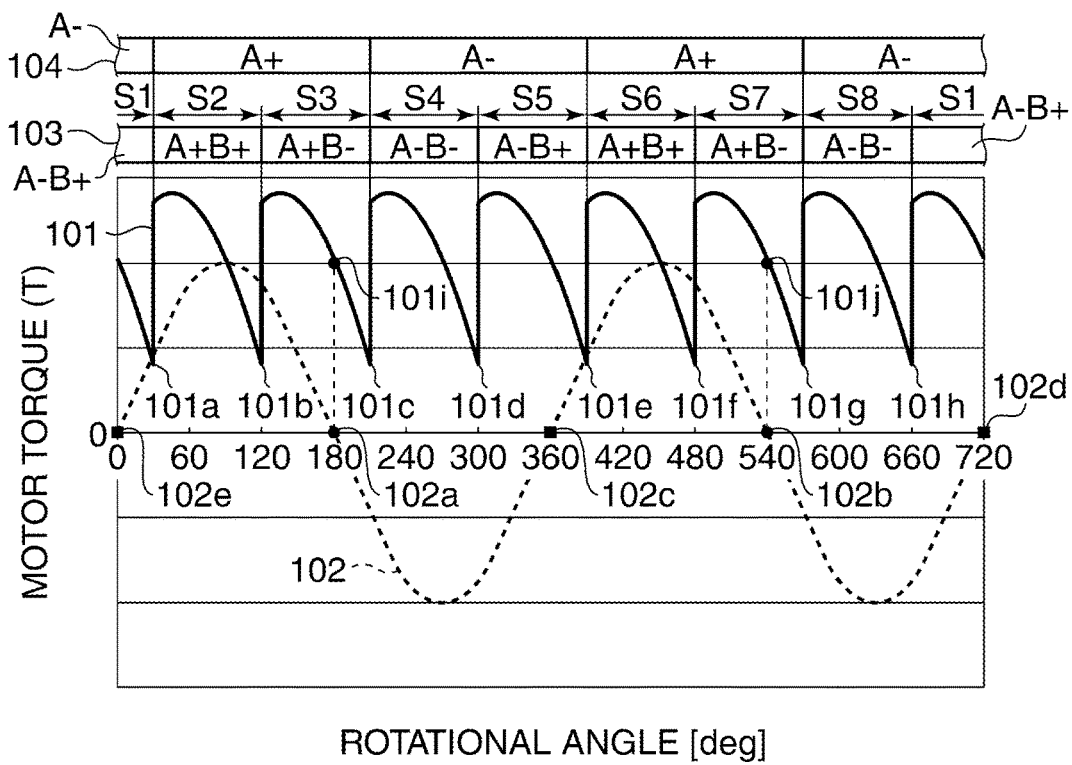
FIGS. 10A and 10B are graphs each showing motor torque generated during half rotation of the motor when the motor driving apparatus drives the motor by small advance angle driving (through single-phase direct current energization).
Figure 10B:
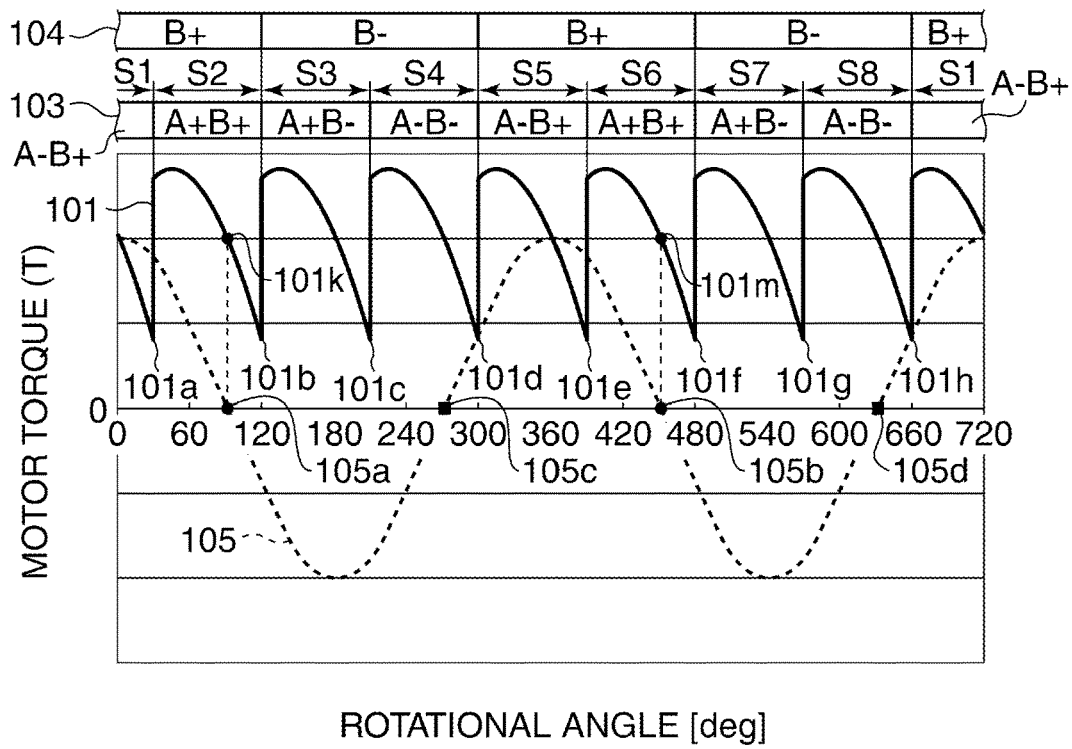

FIGS. 10A and 10B are graphs each showing motor torque generated during half rotation of the motor when the motor is driven by small advance angle driving. Referring to FIG. 10, the horizontal axis represents a rotational angle expressed in an electrical angle, and the horizontal axis represents motor torque. In the present embodiment as well, since the magnet 2 also has the eight poles, the illustrated rotational angle range (720 degrees) corresponds to a mechanical angle range of 180 degrees.

A section 103 in FIGS. 10A and 10B indicates regions S1 to S8 of states of energization, and in these graphs as well, the second magnetic pole portions 7a and the first magnetic pole portions 6a are represented by A and B, respectively, and respective states of energization of each coil causing excitation of associated magnetic pole portions to the N pole and the S pole are represented by signs + and −, respectively. In addition, a section 104 indicates a state of energization of single-phase direct current energization, described hereinafter. Further, the positive direction of the rotational angle in FIGS. 10A and 10B indicates the counterclockwise direction (CCW) of rotation.

A torque line 101 indicates a waveform of torque output from the motor 1 when switching of energization as shown in the section 103 (sequential switching between the states of energization of S1 to S8) is performed (two-phase energization). A torque line 102 in FIG. 10A indicates a waveform of torque output from the motor 1 in a case where direct current energization is performed in a state of energization of A+ (the second magnetic pole portions 7a (for A-phase) are excited to the N pole, and the first magnetic pole portions 6a (for B-phase) are not excited) without performing energization switching.

As indicated by the torque line 101, in the small advance angle driving, a ripple of the motor torque is larger than in the case of the electrical advance angle of 45 degrees, and the torque line 101 has portions where the drop of torque is locally noticeable (hereinafter referred to as the torque dropped portions) 101a to 101h. In FIGS. 10A and 10B, the torque dropped portion periodically occurs at respective rotational angles (electrical angles) of 60+90 (i−1) (i=1, 2, 3, . . . ), and 16 drops occur per one rotation (the mechanical angle of 360 degrees, the electrical angle of 1440 degrees). If the load torque of the driven member is larger than a torque value at each of the torque dropped portions 101a to 101h, the motor 1 cannot be started from the rotational angles corresponding to the torque dropped portions 101a to 101h.

Therefore, when designing the drive mechanism, it is necessary to design the drive mechanism such that the maximum load torque of the driven member in the driving region is smaller than the torque values at the torque dropped portions 101a to 101h. Alternatively, it is necessary to make the torque values at the torque dropped portions 101a to 101h larger than the maximum load torque of the driven member by increasing the driving voltage to thereby increase the whole output of the motor 1. However, this places a restriction on the design of the motor 1, and leads to a lower degree of freedom in design, and an increase in power consumption.

To overcome this problem, in the present embodiment, for small advance angle driving, the start of the motor 1 at the torque dropped portions 101a to 101h is avoided to thereby make it possible to start the motor 1 at a rotational angle at which sufficient torque can be always obtained. This driving of the motor will be described in detail hereafter.

First, in the regions S1 to S4, the combinations of A and B, and + and − are all different. That is, the four combinations of the states of energization of the first and second coils 4 and 5 in the regions S1 to S4 are all different from each other. This means that the combinations of signals output from a pair of sensors, used in each associated energization mode, out of the first to fourth magnetic sensors 8 to 11, in the regions S1 to S4, are all different from each other. The motor 1 repeats these four combinations of the states of energization of the first and second coils 4 and 5, and hence the states of energization in the regions S5 to S8 in FIGS. 10A and 10B are the same as those in the regions S1 to S4. Therefore, it is possible to detect, from a combination of a pair of output signals from a pair of sensors, used in each associated energization mode, out of the first to fourth magnetic sensors 8 to 11, which of the states of energization (A+B+, A+B−, A−B−, and A−B+) of the four regions the rotor 3 in the stopped state is in.

Here, let us consider a case where the rotor 3 is stopped at a rotational angle included in the region S3 (a range of rotational angles of 120 to 210 degrees in FIG. 10A). To start the motor 1 in this region S3, it is necessary to perform energization in the state of energization of A+B− based on the outputs from the pair in use out of the first to fourth magnetic sensors 8 to 11. However, if the rotor 3 is stopped in the vicinity of a rotational angle of 120 degrees or 210 degrees, generation of the motor torque is started from this position, and hence the motor 1 is to be started at the torque dropped portion 101b or 101c.

To prevent the motor 1 from being started at the torque dropped portion 101b or 101c, before starting the motor 1 in the state of energization of A+B− direct current energization (energization without switching coil energization) is performed in the state of energization of A+ in a single phase with the same polarity. At this time, although the torque changes as indicated by the torque line 102, and the rotor 3 is to be stopped at rotational angles corresponding to points 102a and 102b, the point 102a in the region S3 is closer in the rotational angle to the position where the rotor 3 was stopped before direct current energization than the point 102b, and hence in the state of energization of A+, the rotor 3 is moved to the point 102a (rotational angle 180 degrees) and stopped.

After that, in the present embodiment, energization of the first and second coils 4 is performed in the state of energization of A+B− from this stopped position (point 102a). This makes the motor torque high, as indicated by a point 101i, and hence it is possible to start the motor 1 with high motor torque. That is, it is possible to provide sufficient motor torque for the load of the driven member, and hence it is possible to reliably start the motor 1.

Although the above description is given of the case where the rotor 3 is stopped in the region S3 by way of example, even when the rotor 3 is stopped in another region, it is also possible to reliably start the motor 1 using the above-described method. That is, by performing direct current energization in A-phase with the same polarity as that in the state of energization associated with the start time of the motor 1, it is possible to reliably start the motor 1.

For example, in a case where the rotor 3 is stopped in the region S4, direct current energization is performed in the state of energization of A−, in a case where the rotor 3 is stopped in the region S5, direct current energization is performed in the state of energization of A−, and in a case where the rotor 3 is stopped in the region S6, direct current energization is performed in state of energization of A+, and then the motor 1 is started in the state of energization associated with the start time of the motor 1, whereby it is possible to avoid the start at a torque dropped portion. This makes it possible to reliably start the motor 1. Note that when direct current energization is performed in the state of energization of A−, the motor torque generated thereby forms a torque line which is reversed in polarity from the torque line 102. In this case, the rotor 3 is stopped at a point 102e (rotational angle of 0 degrees), a point 102c (rotational angle of 360 degrees), and a point 102d (rotational angle of 720 degrees).

Although the above description is given of direct current energization in A-phase, it is also possible to reliably start the motor 1 for direct current energization in B-phase by performing the same method. The following description will be given of direct current energization in B-phase in detail with reference to FIG. 10B. The same component elements as those in FIG. 10A are denoted by the same reference numerals, and description thereof is omitted.

A torque line 105 indicates torque generated by the motor 1 in a case where direct current energization is performed in the state of energization of B+ without performing energization switching (the first magnetic pole portions 6a (for B-phase) are excited to the N pole, and the second magnetic pole portions 7a (for A-phase) are not excited).

Here, let us consider a case where the rotor 3 is stopped at a rotational angle included in the region S2 (a range of rotational angles of 30 to 120 degrees in FIG. 10B). To start the motor 1 in this region S2, it is necessary to perform energization in the state of energization of A+B+ based on the outputs from the pair in use out of the first to fourth magnetic sensors 8 to 11. However, if the rotor 3 is stopped in the vicinity of a rotational angle of 30 degrees or 120 degrees, generation of the motor torque is started from this position, and hence the motor 1 is to be started at the torque dropped portion 101a or 101b.

To avoid the motor 1 from being started at the torque dropped portion 101a or 101b, before starting the motor 1 in the state of energization of A+B+ direct current energization (energization without switching coil energization) is performed in the state of energization of B+ in a single phase with the same polarity. At this time, although the torque changes as indicated by the torque line 105, and the rotor 3 is stopped at rotational angles corresponding to points 105a and 105b, the point 105a in the region S2 is closer in the rotational angle to the position where the rotor 3 was stopped before direct current energization than the point 105b, and hence the rotor 3 is moved to the point 105a (rotational angle of 90 degrees) and stopped.

In the present embodiment, energization is performed in the state of energization of A+B+ from this stopped position (point 105a). This makes the motor torque high, as indicated by a point 101k, and hence it is possible to start the motor 1 with high motor torque. That is, it is possible to provide sufficient motor torque for the load of the driven member, and hence it is possible to reliably start the motor 1.

Although the above description is given of the case where the rotor 3 is stopped in the region S2 by way of example, even when the rotor 3 is stopped in another region, it is also possible to reliably start the motor 1 using the above-described method. That is, by performing direct current energization in a state of energization in B-phase with the same polarity, it is possible to reliably start the motor 1. For example, in a case where the rotor 3 is stopped in the region S3, direct current energization is performed in the state of energization of B−, in a case where the rotor 3 is stopped in the region S4, direct current energization is performed in the state of energization of B−, and in a case where the rotor 3 is stopped in the region S5, direct current energization is performed in the state of energization of B+, and then the motor 1 is started in the state of energization associated with the start time of the motor 1, whereby it is possible to avoid the start at a torque dropped portion. This makes it possible to reliably start the motor 1. Note that when direct current energization is performed in the state of energization of B−, the motor torque generated thereby forms a torque line which is reversed in polarity from the torque line 105. In this case, the rotor 3 is stopped at t a point 105c (rotational angle of 270 degrees) and a point 105d (rotational angle of 630 degrees).

Incidentally, the positions where the rotor 3 is stopped when the above-mentioned A-phase (A+ or A−) direct current energization is performed are at rotational angles of 0 degrees, 180 degrees, 360 degrees, 540 degrees, and 720 degrees. That is, considering A-phase (A+ or A−) direct current energization time and B-phase (B+ or B−) direct current energization time, one stopped position is necessarily included in each of the regions S1 to S8. Therefore, by selecting A-phase direct current energization or B-phase direct current energization according to a region in which the rotor 3 is stopped before execution of direct current energization (one of the regions S1 to S8), it is possible to cause the rotor to be stopped in the same region before and after execution of direct current energization, and reduce the difference between the stopped positions of the rotor 3.

For example, in a case where the rotor 3 is stopped in the region S1 before execution of direct current energization, it is only required to select direct current energization in the state of energization of A− to thereby cause the rotor 3 to be stopped at the rotational angle of 0 degrees, and in a case where the rotor 3 is stopped in the region S2, it is only required to select direct current energization in the state of energization of B+ to thereby cause the rotor 3 to be stopped at the rotational angle of 90 degrees. Further, in a case where the rotor 3 is stopped in the region S3, it is only required to select direct current energization in the state of energization of A+ to thereby cause the rotor 3 to be stopped at the rotational angle of 180 degrees, and in a case where the rotor 3 is stopped in the region S4, it is only required to select direct current energization in the state of energization of B− to thereby cause the rotor 3 to be stopped at the rotational angle of 270 degrees.

Note that if the drive mechanism is configured to be capable of coping with a large shift in the stopped position of the rotor 3 before and after execution of direct current energization, the motor 1 may be started according to the stopped position of the rotor 3 after performing desired single-phase direct current energization. Further, although the above description is given by taking the rotation in the CCW direction as an example, it is also possible to reliably start the motor 1 by using the same method with respect to the rotation in the CW direction.

As described above, in the present embodiment, before starting the motor 1 in a state of energization determined based on signals output from a pair in use out of the first to fourth magnetic sensors 8 to 11, by performing direct current energization in a single-phase energization state with a polarity which is the same as or different from the state of energization, it is possible to avoid the start of the motor 1 from a rotational angle of a torque dropped portion. This makes it possible to reliably start the motor 1 with high motor torque.

Further, in the present embodiment, since single-phase direct current energization is used which is less in power consumption than in two-phase direct current energization, it is possible to reliably reduce power consumption. The other configuration and advantageous effects are the same as those of the first embodiment.

Next, a third embodiment of the present invention will be described. In a case where the configurations of the first and second embodiments are applied to the motor driving apparatus, if a static friction force of the drive mechanism of the motor driving apparatus is large, even when a driving force is supplied from the motor to a transmission system of the drive mechanism, a phenomenon that the drive mechanism cannot be immediately started sometimes occurs. This phenomenon will be described with reference to FIG. 11 formed by adding elements associated with the static friction torque to FIG. 7.

Figure 11:
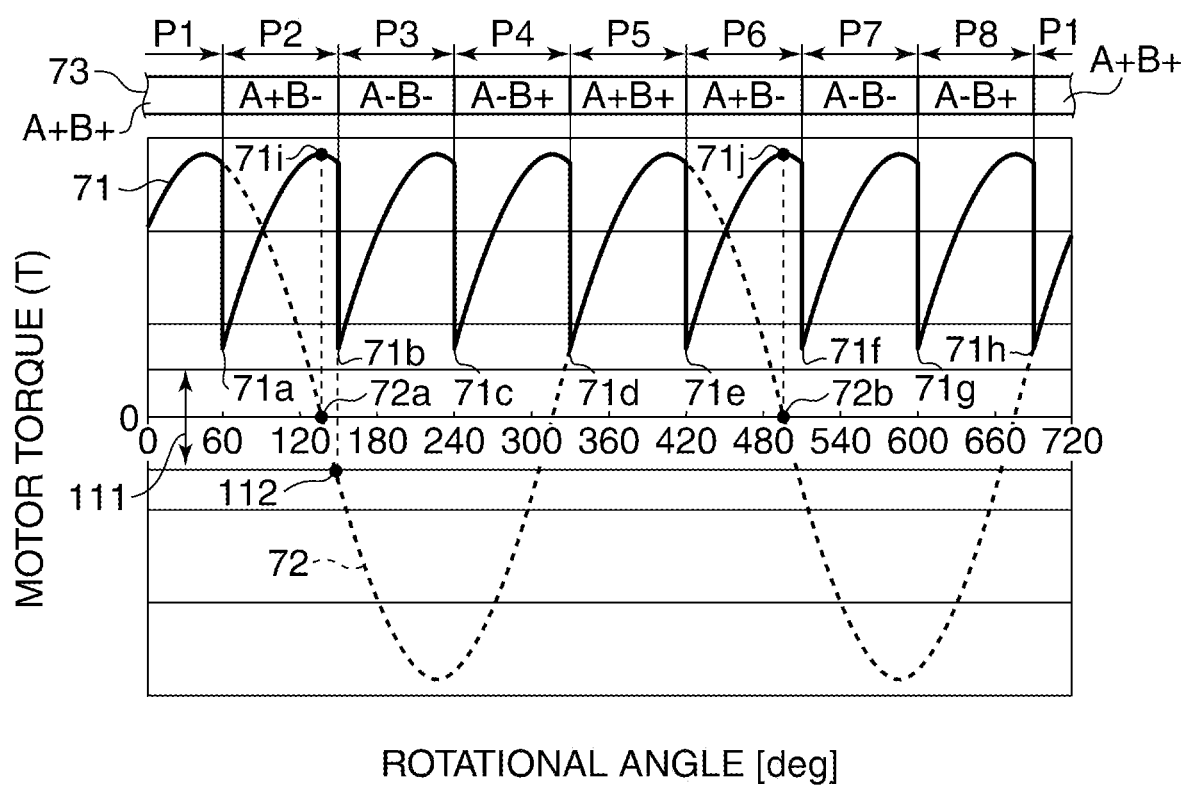
FIG. 11 is a graph useful in explaining changes of a stop rotational angle of the rotor in a case where a static frictional torque acts.

Referring to FIG. 11, when the torque of the motor 1 by direct current energization before the start of the motor 1 falls within a range 111 of the static friction torque, the rotor 3 is stopped at a rotational angle at the time. For example, the rotor 3 is sometimes stopped at a rotational angle 112 which substantially coincides with a rotational angle of the torque dropped portion 71b. In this case, if the motor 1 is to be started at the rotational angle 112, this means that the motor 1 is to be started from the torque dropped portion 71b, and hence it is impossible to obtain sufficient torque at the start of the motor 1, resulting in a long acceleration time. As a result, it is difficult to apply the present invention to a drive mechanism requiring high speed driving.

To overcome this problem, in the present embodiment, the motor 1 is configured such that even with a large static friction torque, sufficient torque can be obtained at the start of the motor 1 by causing the rotor 3 to be stopped at a rotational angle away from the torque dropped portion.

Figure 12:
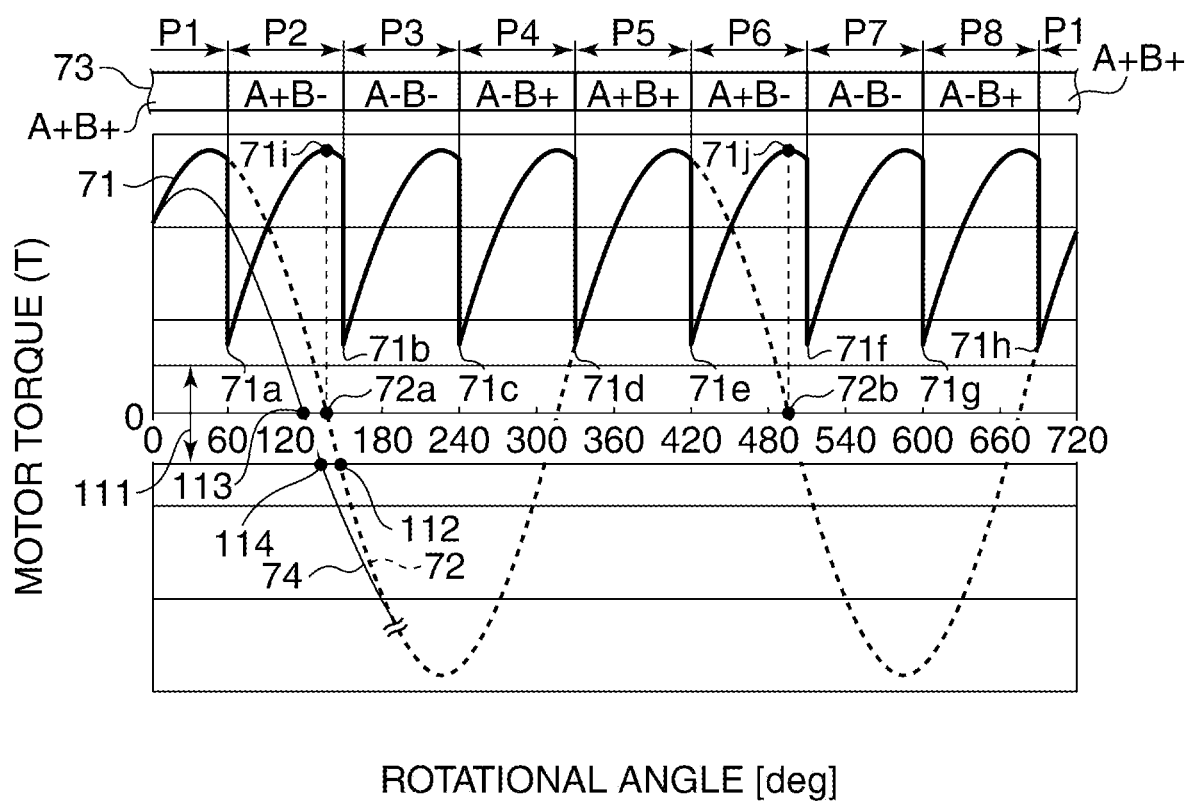
FIG. 12 is a diagram useful in explaining a method of controlling a motor driving apparatus according to a third embodiment of the present invention.

FIG. 12 is a diagram useful in explaining a method of controlling the motor driving apparatus according to the present embodiment. Referring to FIG. 12, in a case where respective energization voltages for A-phase and B-phase in FIG. 7 are defined as 100%, a torque line 74 indicates a waveform of torque (part of the waveform after the rotational angle 200 degrees is omitted from illustration) output by the motor 1 when the energization voltage for A+ is 70%, and the energization voltage for B+ is 100%. In the torque line 74, compared with the torque line shown in FIG. 7, the rotational angle at which the rotor 3 is stopped (hereinafter referred to as the stop rotational angle) shifts from the point 72a to a point 113 when direct current energization is performed in the state of energization of A+B+. The following description will be given of a reason why the stop rotational angle moves from the point 72a to the point 113 with reference to FIGS. 13A and 13B.

Figure 13A:
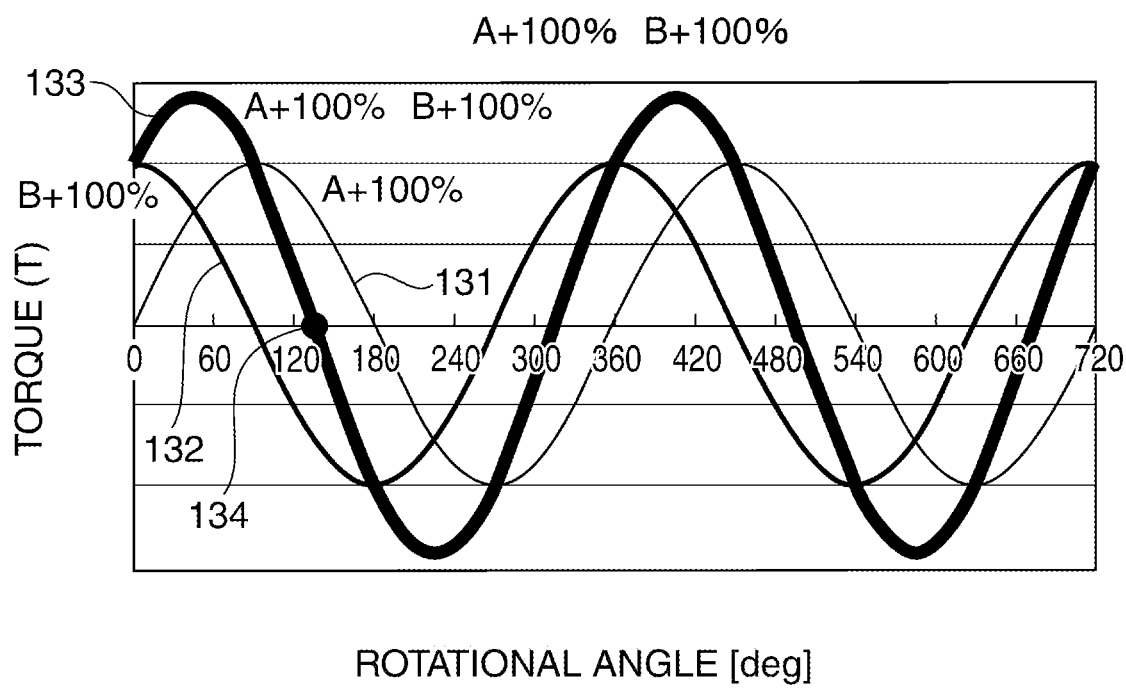
FIGS. 13A and 13B are graphs showing motor torques generated in an A-phase and a B-phase, respectively, when direct current energization is executed in the third embodiment of the present invention.
Figure 13B:
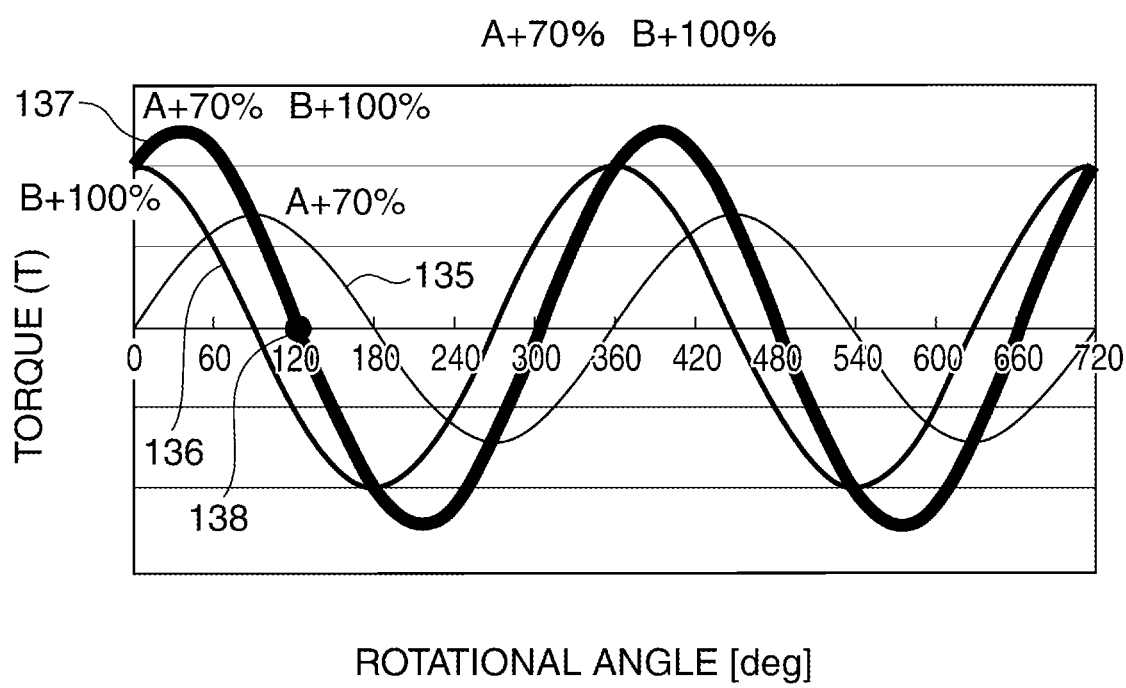

FIGS. 13A and 13B are graphs each showing motor torques generated by energization in A-phase and B-phase, respectively, when direct current energization is executed in the state of energization of A+B+, and motor torque obtained by adding the two torques. FIG. 13A shows a state in which the energization voltage for A+ is 100% and the energization voltage for B+ is 100%, while FIG. 13B shows a state in which the energization voltage for A+ is 70%, and the energization voltage for B+ is 100%.

Referring to FIG. 13A, a torque waveform 131 is a waveform of torque output from the motor 1 by direct current energization in A-phase when the energization voltage for A+ is, a torque waveform 132 is a waveform of torque output from the motor 1 by direct current energization in B-phase when the energization voltage for B+ is 100%, and a torque waveform 133 is a waveform of torque formed by adding the torque waveform 131 and the torque waveform 132. Further, referring to FIG. 13B, a torque waveform 135 is a waveform of torque output from the motor 1 by direct current energization in A-phase when the energization voltage for A+ is 70%, a torque waveform 136 is a waveform of torque output from the motor 1 by direct current energization in B-phase when the energization voltage for B+ is 100%, and a torque waveform 137 is a waveform of torque formed by adding the torque waveform 135 and the torque waveform 136.

In a case where adverse influence of the static friction torque on the stop rotational angle is not considered, as shown in FIG. 13A, the energization voltage for A+ is set to 100%, and the energization voltage for B+ is set to 100%. In this case, the stop rotational angle in a case where the static friction torque does not act is at a point 134 in the vicinity of 125 degrees. On the other hand, in a case where adverse influence of the static friction torque on the stop rotational angle is considered, as shown in FIG. 13B, the energization voltage for A+ is set to 70%, and the energization voltage for B+ is set to 100%. In this case, the stop rotational angle in the case where the static friction torque does not act is smaller than the rotational angle of the point 134, and is e.g. at a point 138 in the vicinity of 125 degrees. That is, for direct current energization before the start, by setting the energization voltage for A-phase to 100% and the energization voltage for B-phase to 70%, compared with a case where the energization voltage for A-phase and the energization voltage for B-phase in the direct current energization before the start are equal to each other (100%), the stop rotational angle is reduced by approximately 10 degrees. Note that it is clear from the torque waveforms shown in FIGS. 13A and 13B that by further reducing the ratio of the energization voltage for A-phase in the direct current energization before the start to the energization voltage for B-phase (e.g. to 50% or 30%), it is possible to further reduce the stop rotational angle.

As described above, in the case where the energization voltage for A+ is set to 70%, and the energization voltage for B+ is set to 100%, the stop rotational angle in the case where the static friction torque does not act is at approximately 125 degrees, and hence the stop rotational angle is indicated by the point 113 (125 degrees) in the FIG. 12 graph. However, in actuality, the static friction torque acts, and hence the stop rotational angle is at a point 114 at which the torque line 74 intersects with the boundary of the range 111 of the static friction torque. Thus, by changing the ratio of the energization voltage for A+ to the energization voltage for B+, it is possible to shift, as desired, the stop rotational angle in the case where the static friction torque acts, and prevent the rotor 3 from being stopped at the rotational angle 112 which substantially coincides with the rotational angle of the torque dropped portion 71b. As a result, it is possible to obtain sufficient torque to start the motor 1, and prevent the acceleration time of the rotor 3 from being increased.

Although the above description is given of the case where the rotor 3 is stopped in the region P2 (the stop rotational angle is included in the region P2) with reference to FIGS. 11 and 12, even in a case where the rotor 3 is stopped in the region P3, it is possible to obtain sufficient torque at the start of the motor 1 using the above-described method. In this case, although the rotor 3 is stopped in the region P3 by direct current energization in the state of energization of A+B− before starting the motor 1, at this time, by reducing the energization voltage for B− with respect to the energization voltage for A+, similar to the above-described case, it is possible to prevent the stop rotational angle of the rotor 3 from substantially coinciding with a rotational angle of the torque dropped portion 71c, for example. Hereafter, a detailed description will be given of this case with reference to FIGS. 14A and 14B.

Figure 14A:
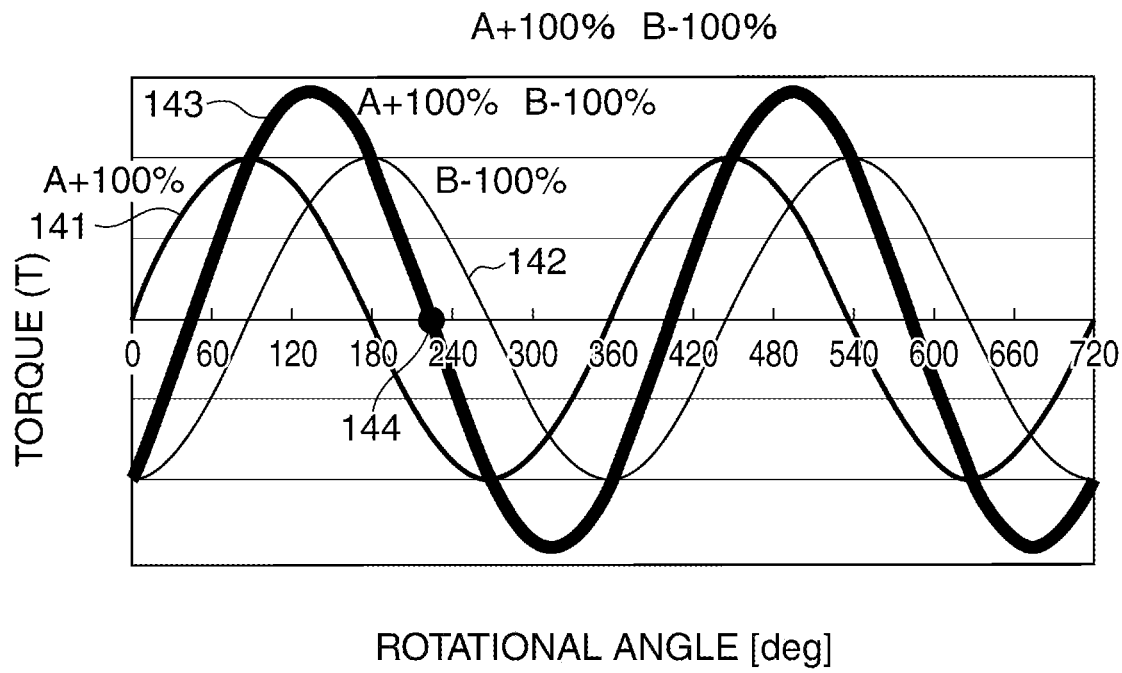
FIGS. 14A and 14B are graphs showing other motor torques generated by energization in A-phase and B-phase, respectively, when direct current energization is executed in the third embodiment of the present invention.
Figure 14B:
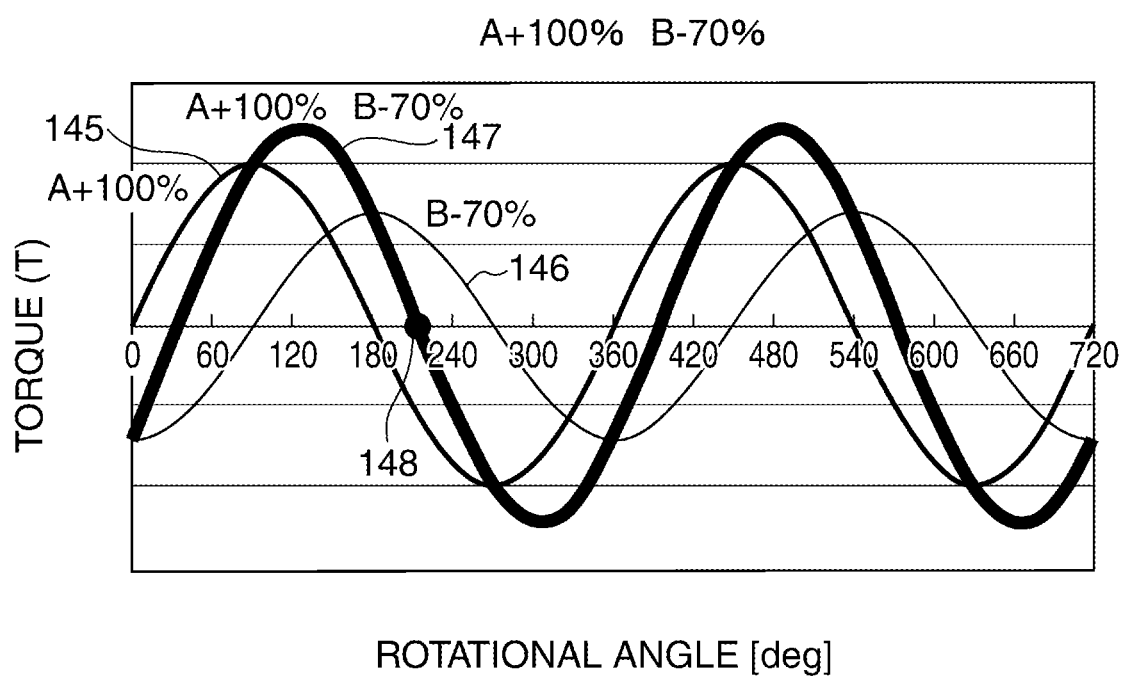

FIGS. 14A and 14B are graphs each showing motor torques generated by energization in A-phase and B-phase, respectively, when direct current energization is executed in the state of energization of A+B−, and motor torque obtained by adding the two torques. FIG. 14A shows a state in which the energization voltage for A+ is 100% and the energization voltage for B− is 100%, while FIG. 14B shows a state in which the energization voltage for A+ is 100%, and the energization voltage for B− is 70%.

Referring to FIG. 14A, a torque waveform 141 is a waveform of torque output from the motor 1 by direct current energization in A-phase when the energization voltage for A+ is 100%, a torque waveform 142 is a waveform of torque output from the motor 1 by direct current energization in B-phase when the energization voltage for B− is 100%, and a torque waveform 143 is a waveform of torque formed by adding the torque waveform 141 and the torque waveform 142. Further, referring to FIG. 14B, a torque waveform 145 is a waveform of torque output from the motor 1 by direct current energization in A-phase when the energization voltage for A+ is 100%, a torque waveform 146 is a waveform of torque output from the motor 1 by direct current energization in B-phase when the energization voltage for B− is 70%, and a torque waveform 147 is a waveform of torque formed by adding the torque waveform 145 and the torque waveform 146.

In a case where adverse influence of the static friction torque on the stop rotational angle is not considered, as shown in FIG. 14A, the energization voltage for A+ is set to 100%, and the energization voltage for B− is set to 100%. In this case, the stop rotational angle in a case where the static friction torque does not act is at a point 144 in the vicinity of 225 degrees. On the other hand, in a case where adverse influence of the static friction torque on the stop rotational angle is considered, as shown in FIG. 14B, the energization voltage for A+ is set to 100%, and the energization voltage for B− is set to 70%. In this case, the stop rotational angle in a case where the static friction torque does not act is smaller than the rotational angle of the point 144, and is at a point 148 in the vicinity of 215 degrees, for example. That is, by setting energization voltage for B-phase in direct current energization before the start to 70% of the energization voltage for A-phase, compared with a case where the energization voltage for A-phase and the energization voltage for B-phase in the direct current energization before the start are equal to each other, the stop rotational angle is reduced by approximately 10 degrees. This makes it possible to prevent the stop rotational angle in a case where the static friction torque acts from coinciding with a rotational angle of the torque dropped portion 71c. As a result, it is possible to obtain sufficient torque when the motor 1 is started, and prevent the acceleration time of the rotor 3 from being increased.

Note that it is clear from the torque waveforms shown in FIGS. 14A and 14B that by further reducing the ratio of the energization voltage for B-phase in the direct current energization before the start with respect to the energization voltage for A-phase (e.g. to 50% or 30%), it is possible to further reduce the stop rotational angle.

In the present embodiment, the description is given of the example in which the energization voltage for A-phase in the direct current energization before the start is made lower than the energization voltage for B-phase, and the example in which the energization voltage for B-phase in the direct current energization before the start is made lower than the energization voltage for A-phase, so as to control, in both the cases, the stop rotational angle before the start as desired. However, which of the energization voltage for A-phase and the energization voltage for B-phase is to be reduced is determined depending on the state of energization of the direct current energization before the start. More specifically, in a case where A-phase and B-phase have the same sign, (A+B+ or A−B−), the energization voltage for A-phase in the direct current energization is made lower than the energization voltage for B-phase. Further, in a case where A-phase and B-phase have different signs, (A+B− or A−B+), the energization voltage for B-phase in the direct current energization is made lower than the energization voltage for A-phase. Note that it is possible to reverse the relationship of signs by changing the settings of A-phase and B-phase.

In the above-described method of controlling the motor driving apparatus according to the present embodiment, first, the control circuit 13 determines the state of energization of the direct current energization before the start based on signals output from a pair in use out of the first to fourth magnetic sensors 8 to 11, and selects an energization voltage to be reduced out of the energization voltage for A-phase and the energization voltage for B-phase based on the relationship of the signs of A-phase and B-phase of the determined state of energization of the direct current energization. After that, a result of the selection is transmitted to a driving driver as a driving signal.

Note that even in a case where the rotor 3 is stopped in the region P4 or P1, it is possible to obtain sufficient torque when the motor 1 is started using the above-described method.

In the present embodiment, the energization voltage to be reduced is selected out of the energization voltage for A-phase and the energization voltage for B-phase according to the state of energization of the direct current energization before the start, whereby it is possible to prevent the stop rotational angle in a case where the static friction torque acts from substantially coinciding with a torque dropped portion. Note that it is preferable to determine the ratio between the energization voltage for A-phase and the energization voltage for B-phase according to the static friction torque and the condition of load at the start when designing the drive mechanism.

Next, a fourth embodiment of the present invention will be described. A magnetic induction element, such as a hall element, is applied to the first to fourth magnetic sensors 8 to 11 of the present invention. The magnetic induction element detects the N pole and the S pole of the magnet 2 (rotor 3), and outputs a signal according to the detected magnetic pole.

Figure 15:
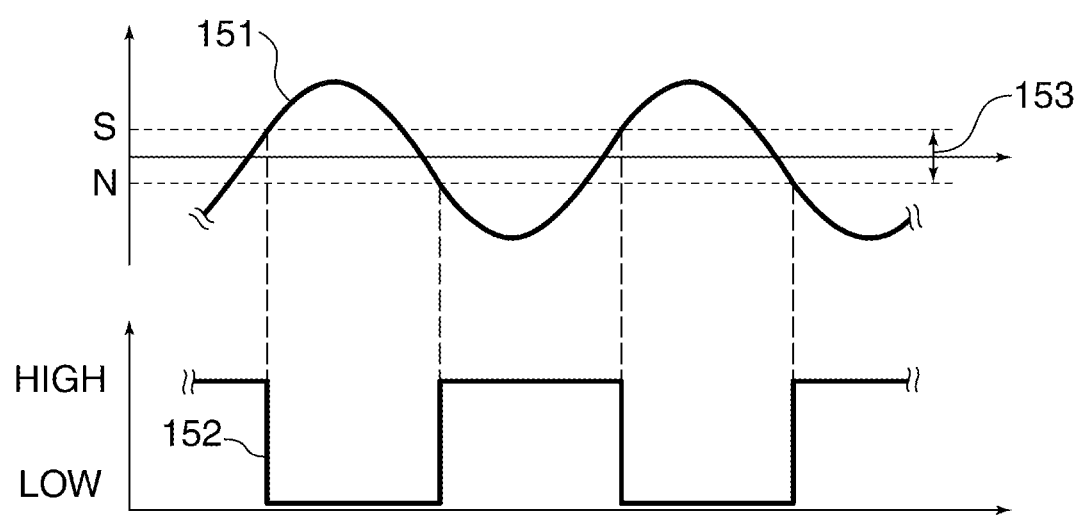
FIG. 15 is a diagram useful in explaining how a signal is output from each magnetic sensor.

For example, the first to fourth magnetic sensors 8 to 11 each output a Low or High signal according to the detected magnetic pole. FIG. 15 is a diagram useful in explaining how a signal is output from each magnetic sensor. Referring to FIG. 15, an output signal (binary; Low or High) 152 is output from each of the first to fourth magnetic sensors 8 to 11 according to a magnetic field strength 151 of the magnet. Note that the first to fourth magnetic sensors 8 to 11 are each provided with a non-detection range 153 so as to prevent chattering across the boundary between the N pole and the S pole of the magnet.

In FIG. 15, as the magnetic field strength 151 of the magnet changes with the lapse of time, each of the first to fourth magnetic sensors 8 to 11 outputs a Low signal or a High signal when the magnetic field strength 151 leaves the non-detection range 153. That is, a Low signal or a High signal is output with a time lag after each magnetic sensor passes the boundary between the N pole and the S pole of the magnet 2, and hence timing in which energization of the coils is switched is delayed from timing in which each magnetic sensor passes the boundary between the N pole and the S pole.

The influence of this delay will be described e.g. with reference to FIG. 7. Specifically, the torque dropped portions 71a to 71h of the torque line 71, which coincide with the coil energization switching timing, are delayed in occurrence, so that the torque dropped portions 71a to 71h shift rightward in FIG. 7. However, in this case, the torque dropped portion 71b is moved away from the point 72a, which is the stop rotational angle of the rotor 3 in direct current energization in the state of energization of A+B+, and hence there is no problem concerning the start of the motor 1.

Incidentally, when power is supplied to each of the first to fourth magnetic sensors 8 to 11 immediately before starting the motor 1, in a case where a magnetic field strength to be detected by each magnetic sensor exists in the non-detection range 153, it is impossible to determine which of a Low signal and a High signal is to be output, and hence processing for determining an output signal as one of a Low signal and a High signal and outputting the determined signal is performed (hereinafter referred to as provisional signal output). As a result, before each magnetic sensor passes the boundary between the N pole and the S pole of the magnet 2, switching of the output of a Low signal and a High signal is sometimes performed to switch the energization of the coils.

The influence of the coil energization switching timing earlier than the timing in which each magnetic sensor passes the boundary between the N pole and the S pole will be described e.g. with reference to FIG. 7. Specifically, the torque dropped portions 71a to 71h in the torque line 71, which match the coil energization switching timing, occur earlier, so that the torque dropped portions 71a to 71h shift leftward in FIG. 7.

Figure 16:
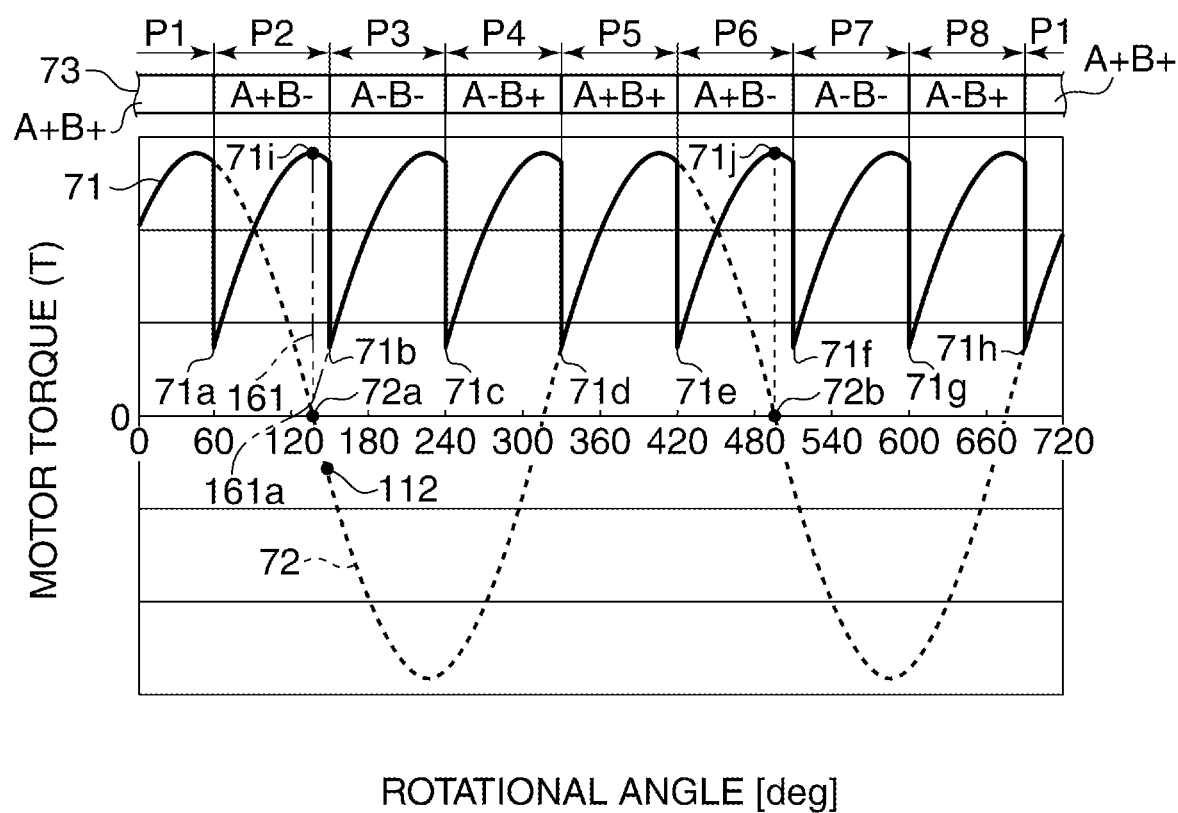
FIG. 16 is a diagram useful in explaining a problem caused by setting a non-detection range for each magnetic sensor.

More specifically, as shown in FIG. 16, in the vicinity of the torque dropped portion 71b, the torque line 71 changes as in a line 161 indicated by a two-dot chain line, and a changed torque dropped portion 161a sometimes substantially coincides with the point 72a which is the stop rotational angle of the rotor 3 in direct current energization in the state of energization of A+B+. As a result, the motor 1 is to be started from the torque dropped portion, and hence there is a fear that the motor 1 cannot be properly started.

Figure 17:
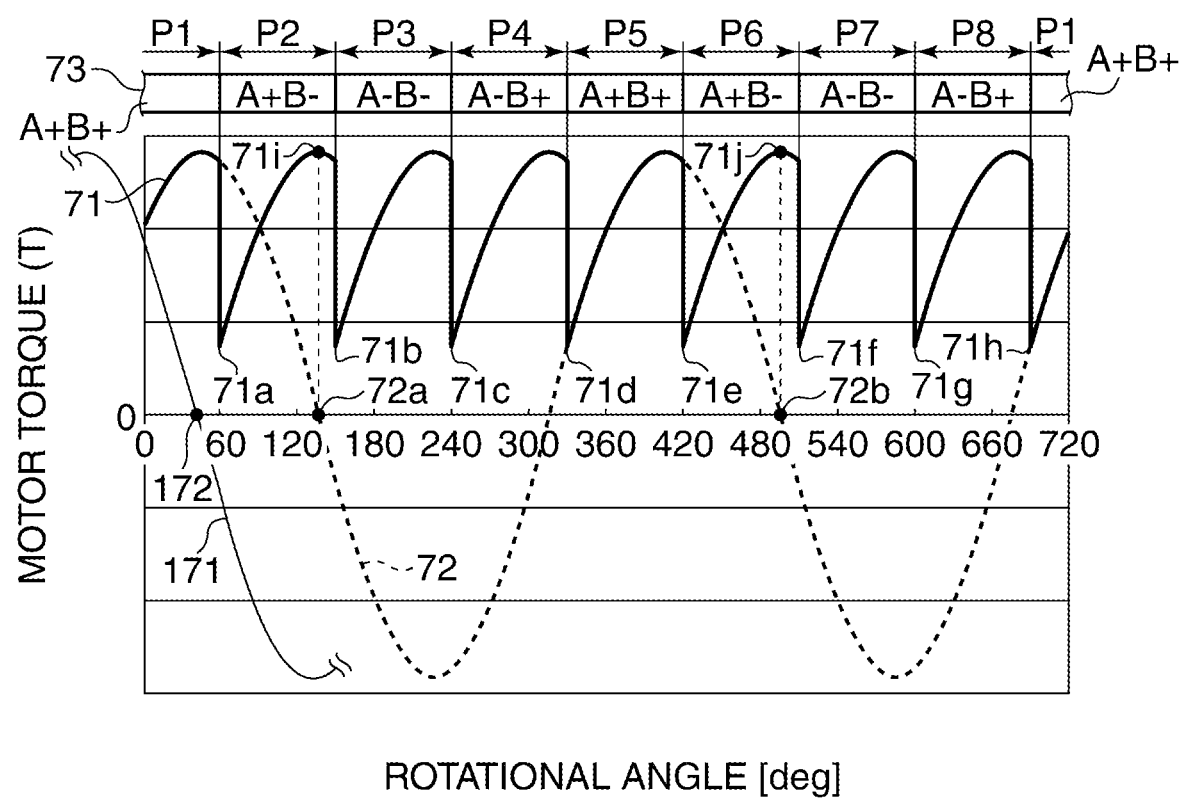
FIG. 17 is a diagram useful in explaining a method of controlling a motor driving apparatus according to a fourth embodiment of the present invention.

To solve this problem, in the present embodiment, the stop rotational angle of the rotor 3 before the start is largely moved by changing the state of energization of the direct current energization so as to prevent the stop rotational angle of the rotor 3 before the start and the torque dropped portion from coinciding with each other even when the torque dropped portion in the torque line 71 is moved by the provisional signal output. This change of the state of energization of the direct current energization will be described with reference to FIG. 17.

Although in the first and third embodiments described above, in a case where a region where the motor 1 is to be started (hereinafter referred to as the start region) is the region P2, before starting the motor 1, direct current energization is performed in the state of energization of A+B+ which is the state of energization in the region P1 preceding by one region the start region with respect to the CCW direction, in the present embodiment, direct current energization is performed in the state of energization of A−B+ which is a state of energization in the region P4 preceding by two regions the start region with respect to the CCW direction. The torque of direct current energization in the state of energization of A−B+ changes as indicated by a torque line 171, and the rotor 3 is stopped at a rotational angle of a point 172. The point 172 is largely away from the torque dropped portion 71b, and further is leftward of the torque dropped portion 71a. Therefore, even when the torque dropped portion 71b in the torque line 71 shifts leftward by the provisional signal output, and is moved to the torque dropped portion 161a in FIG. 16, the stop rotational angle (point 172) of the rotor 3 before the start and the torque dropped portion 161a do not coincide with each other.

That is, before power is supplied to the first to fourth magnetic sensors 8 to 11 immediately before starting the motor 1, direct current energization is performed in a state of energization associated with a region preceding by two regions the start region with respect to the CCW direction, whereby it is possible to prevent the stop rotational angle of the rotor 3 before the start and the torque dropped portion which is moved by the provisional signal output from coinciding with each other.

Note that when necessary and sufficient time which is taken for the magnetic field strength 151 detected by each magnetic sensor to leave the non-detection range 153 elapses after the rotor 3 starts to be rotated by performing direct current energization in the state of energization associated with a region preceding by two regions the start region with respect to the CCW direction, direct current energization is performed instate of energization (A+B+) associated with the region preceding by one region the start region with respect to the CCW direction. With this, the stop rotational angle of the rotor 3 is moved from the point 172 to the point 72a. At this time, the magnetic field strength 151 has left the non-detection range 153, the provisional signal output is not excuted, and occurrence of a torque dropped portion is not made earlier, and hence even when the stop rotational angle of the rotor 3 is moved to the point 72a, the stop rotational angle of the rotor 3 is prevented from coinciding with the torque dropped portion. After that, it is possible to start the motor 2 with high motor torque by performing direct current energization in the state of energization (A+B−) of the region P2.

Although in the above-described example, to largely move the stop rotational angle of the rotor 3 before starting the motor 1, direct current energization in a state of energization associated with a region preceding by two regions the start region with respect to the CCW direction is performed, direct current energization in the state of energization of the start region (P2) may be performed instead. In this case, the torque line of this direct current energization shifts rightward in FIG. 7, and the torque becomes equal to "0" in the region P3, and hence the stop rotational angle of the rotor 3 is moved to the region P3. As a result, it is also possible to prevent the stop rotational angle of the rotor 3 from coinciding with the torque dropped portion which shifts leftward in FIG. 7 by the provisional signal output, and obtain the same advantageous effects as provided by the above-described examples.

That is, in the present embodiment, the state of energization of the direct current energization before the start are changed so as to move the stop rotational angle of the rotor 3 before the start to one of regions before and after the start region with respect to the CCW direction.

Note that if there are mechanical and time margins before starting the motor 1, a region to which the stop rotational angle of the rotor 3 is moved is not limited to one of regions before and after the start region with respect to the CCW direction, but may be any suitable region other than the start region, such as a region preceding by two regions the start region with respect to the CCW direction and as a region following, by two regions, the start region in the CCW direction.

Further, although in the present embodiment, two-phase (multiple phase) direct current energization is used, as in the second embodiment, driving of the rotor 3 until the magnetic field strength 151 detected by each magnetic sensor leaves the non-detection range 153 may be performed using single-phase direct current energization. This also makes it possible to obtain the same advantageous effects as provided by using the two-phase direct current energization.

As described above, in the present embodiment, the state of energization of the direct current energization before the start is changed so as to move the stop rotational angle of the rotor 3 before the start to one of regions before and after the start region with respect to the CCW direction, and when the magnetic field strength 151 detected by each magnetic sensor leaves the non-detection range 153, direct current energization is performed in the state of energization associated with a region preceding by one region the start region with respect to the CCW direction. This prevents the stop rotational angle of the rotor 3 from coinciding with the torque dropped portion, whereby it is possible to reliably and properly start the motor 1.

Note that the material, the shape, the size, the form, the number, and the arrangement position of each member described in the embodiments by way of example can be changed without departing from the spirit and scope of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-215595 filed Nov. 8, 2017, and Japanese Patent Application No. 2018-189477 filed Oct. 4, 2018, which are hereby incorporated by reference herein in their entirety.

What is claimed is:

1. A motor driving apparatus comprising:
a motor, and
a control circuit that controls driving of the motor, the motor including:
a rotor having a magnet that has a cylindrical shape and an outer peripheral surface which is divided in a circumferential direction and is alternately multi-polar magnetized to different poles,
a first yoke having first magnetic pole portions which are arranged in an opposed relationship to the outer peripheral surface of the magnet,
a first coil that is energized to thereby excite the first magnetic pole portions,
a second yoke having second magnetic pole portions which are arranged in an opposed relationship to the outer peripheral surface of the magnet at respective positions shifted from the first magnetic pole portions each by a predetermined electrical angle, and
a second coil that is energized to thereby excite the second magnetic pole portions,
wherein the control circuit drives the rotor by switching respective directions of energizing the first coil and the second coil based on outputs from a plurality of position detection sensors that detect a rotational position of the rotor, to thereby change poles to which the first magnetic pole potions and the second magnetic pole portions are excited; and
when the rotor is started from a state in which the rotor is stopped, the control circuit performs direct current energization to move the rotor to a position dependent on the direct current energization, and then starts the rotor.

2. The motor driving apparatus according to claim 1, wherein the direct current energization is performed by said exciting of a plurality of phases before starting the rotor.

3. The motor driving apparatus according to claim 2, wherein in the direct current energization, an energization voltage of one of the plurality of phases subjected to said exciting is made different from an energization voltage of the other phase.

4. The motor driving apparatus according to claim 1, wherein the direct current energization is performed by said exciting of a single phase before starting the rotor.

5. The motor driving apparatus according to claim 1, wherein the direct current energization is performed in a state of energization based on outputs from the position detection sensors.

6. The motor driving apparatus according to claim 1, wherein the direct current energization is performed in a state of energization preceding by one state a state of energization associated with a start time of the rotor with respect to a rotational direction.

7. The motor driving apparatus according to claim 1, wherein the direct current energization is first performed in a state of energization preceding by two states a state of energization associated with a start time of the rotor with respect to a rotational direction, and then is performed in a state of energization preceding by one state the state of energization associated with the start time of the rotor with respect to the rotational direction.

8. The motor driving apparatus according to claim 1, wherein the direct current energization is first performed in a state of energization associated with a start time of the rotor, and then is performed in a state of energization preceding by one state the state of energization associated with the start time of the rotor with respect to a rotational direction.

9. The motor driving apparatus according to claim 1, wherein the direct current energization is performed in a desired state of energization.

10. The motor driving apparatus according to claim 9, wherein after the direct current energization is performed to thereby move the rotor to the position dependent on the direct current energization, the rotor is started in a state of energization determined based on outputs from the position detection sensors.

11. A method of controlling driving of a motor including a rotor having a magnet that has a cylindrical shape and an outer peripheral surface which is divided in a circumferential direction and is alternately multi-polar magnetized to different poles, a first yoke having first magnetic pole portions which are arranged in an opposed relationship to the outer peripheral surface of the magnet, a first coil that is energized to thereby excite the first magnetic pole portions, a second yoke having second magnetic pole portions which are arranged in an opposed relationship to the outer peripheral surface of the magnet at respective positions shifted from the first magnetic pole portions each by a predetermined electrical angle, and a second coil that is energized to thereby excite the second magnetic pole portions, the method comprising:

driving the rotor by switching respective directions of energizing the first coil and the second coil based on outputs from a plurality of position detection sensors that detect a rotational position of the rotor, to thereby change poles to which the first magnetic pole potions and the second magnetic pole portions are excited; and performing, when starting the rotor from a state in which the rotor is stopped, direct current energization to move the rotor to a position dependent on the direct current energization, and then starting the rotor.

\* \* \* \* \*